(12) United States Patent
Ohmura

(10) Patent No.: US 6,701,845 B2
(45) Date of Patent: Mar. 9, 2004

(54) PRINT SYSTEM AND HANDY PHONE

(75) Inventor: Akira Ohmura, Kawasaki (JP)

(73) Assignee: Nikon Corporation & Nikon Technologies Inc., Tokyo (JP)

( * ) Notice: Subject to any disclaimer, the term of this patent is extended or adjusted under 35 U.S.C. 154(b) by 314 days.

(21) Appl. No.: 09/809,227

(22) Filed: Mar. 16, 2001

(65) Prior Publication Data

US 2001/0022913 A1 Sep. 20, 2001

(30) Foreign Application Priority Data

Mar. 17, 2000 (JP) ........................................ 2000-076267
Mar. 28, 2000 (JP) ........................................ 2000-088336

(51) Int. Cl.$^7$ .............................................. B41L 39/00
(52) U.S. Cl. ......................... 101/484; 400/61; 400/70; 400/76
(58) Field of Search ...................... 101/484; 355/39; 400/76, 70, 61

(56) References Cited

U.S. PATENT DOCUMENTS

| | | | | |
|---|---|---|---|---|
| 5,666,215 A | * | 9/1997 | Fredlund et al. | 358/487 |
| 6,157,436 A | * | 12/2000 | Cok | 355/40 |
| 6,206,585 B1 | * | 3/2001 | Walter | 396/564 |
| 6,219,151 B1 | * | 4/2001 | Manglapus et al. | 358/1.15 |
| 6,233,399 B1 | * | 5/2001 | Walter | 396/2 |
| 6,340,978 B1 | * | 1/2002 | Mindrum | 345/764 |
| 6,417,913 B2 | * | 7/2002 | Tanaka | 355/39 |
| 6,480,293 B1 | * | 11/2002 | Bonikowski et al. | 358/1.15 |
| 6,559,965 B1 | * | 5/2003 | Simpson et al. | 358/1.15 |
| 2001/0050684 A1 | * | 12/2001 | Smith | 345/467 |
| 2002/0180879 A1 | * | 12/2002 | Shiohara | 348/333.05 |
| 2002/0181029 A1 | * | 12/2002 | Fredlund et al. | 358/487 |

FOREIGN PATENT DOCUMENTS

| | | |
|---|---|---|
| JP | 11-146308 A | 5/1999 |
| JP | 11-154218 A | 6/1999 |
| JP | 11-205503 A | 7/1999 |

OTHER PUBLICATIONS

Computer Transaltion of JP 11–154218 to Fuji.*
Computer Translation of JP 11–146308 to Fuji.*
Computer Translation of JP 11–205503 to Fuji.*

* cited by examiner

Primary Examiner—Charles H. Nolan, Jr.
(74) Attorney, Agent, or Firm—Oliff & Berridge, PLC

(57) ABSTRACT

A print system receives an image file and a print order file from a customer, the image file having an image data area and an order data area. The print system copies information of the received print order file into the order data area of the received image file. The print system produces a print of the image data in the image file according to the information in the order data area of the image file. The print system has a printer capable of producing a print of a predetermined image data provided by a third party as well as that of the image data of the customer. The print system delivers to the customer the print ordered by the customer as well as the print of the predetermined image data. The print system selects a group of orders among all the orders in accordance with the destination of delivery for controlling the printer to give priority to the group of orders in producing the prints. The print system forbids the printer to produce the print of the image data of the same customer until a predetermined time. The order from the customer is made through a handy phone capable of controlling a digital camera through a wireless system.

35 Claims, 22 Drawing Sheets

PRINT SYSTEM AND HANDY PHONE

BACKGROUND OF THE INVENTION

This application is based upon and claims priority of Japanese Patent Application No. 2000-076267 filed on Mar. 17, 2000, and No. 2000-088336 filed on Mar. 28, 2000, the contents being incorporated herein by reference.

1. Field of the Invention

The present invention relates to a print system in which a customer transfers image data to the print system through a network and a printer in the print system produces prints of the transferred image data, and more particularly to a print system in which a customer transfers image data via a handy phone.

2. Description of Related Art

A service is being provided in which a customer transmits image data to a shop using the Internet, and the image data is stored into an image storing server of the shop. Alternatively in this service, a customer carries the image data into the shop and the image data is stored into the image storing server. And the customer orders prints from among image data stored in the image storing server. Japanese Patent Publication 11-146308 discloses a technology in which an image is printed in response to print-order information. Japanese Patent Publication 11-205503 discloses a technology in which a photo laboratory, which performs printing, is chosen based on recipient data, and also discloses a technology in which a photo laboratory is chosen based on photo laboratory's operating conditions. Furthermore, Japanese Patent Publication 11-154218 discloses a technology in which a photo laboratory is chosen based on print-order information. Widespread use of the Internet and the digital image allows a photo laboratory to accept print orders from everywhere. However, a customer cannot yet have information about the status of his prints in the photo laboratory. If a photo laboratory prints a large amount of image data of the same customer at one time, the photo laboratory can decrease the cost of printing because packaging and delivering of prints can be made at one time. However, it takes a long time for the same customer to transmit a large amount of image data at one time, causing him a difficulty.

SUMMARY OF THE INVENTION

In order to overcome the problems and disadvantages, the invention provides a print system comprising a receiver that receives an image file and a print order file from a customer and a controller that copies information of the received print order file into the order data area of the received image file. The image file has an image data area and an order data area. The print system further comprises a printer that produces a print of the image data in the image file according to the information in the order data area of the image file. This makes it possible to avoid the misprints.

According to the another feature of the invention, a print system comprises a receiver that receives an image data and a print order data from a customer and a printer that produce a print of the image data in accordance with the order data. The printer is capable of further producing a print of a predetermined image data provided by a third party. The print system further comprises a controller that delivers to the customer the print ordered by the customer as well as the print of the predetermined image data. This makes it possible for the third party to deliver to the customer the print of the predetermined image data for the purpose of an advertisement.

According to still another feature of the invention, a print system comprises a receiver that receives a plurality of orders from customers to produce prints of image data, each order designating destination of delivery of the prints. The print system further comprises a printer that produces the prints and a controller that selects a group of orders among all the orders in accordance with the destination of delivery for controlling the printer to give priority to the group of orders in producing the prints. This is advantageous for the print system to more efficiently deliver the prints.

According to a further feature of the invention, a print system comprises a receiver that receives an image data and a print order data, the print order data including an identification of a customer of the order and a printer that produces a print of the image data according to the print order data. The print system further comprises a controller that forbids the printer to produce the print of the image data of a predetermined customer until a predetermined time on the basis of the identification in the print order data. This is advantageous for the print system to more efficiently package the prints of the predetermined customer.

According to another feature of the invention, the print system comprises a handy phone with a wireless system capable of communication with a digital camera. The print system conveniently receives the image file and the print order file from the customer by way of the handy phone, the image file being originated by the digital camera. The handy phone also conveniently controls the digital camera through the wireless system.

DETAILED DESCRIPTION OF THE PREFERRED EMBODIMENTS

First Embodiment

A first embodiment of a printing system according to the present invention will be described with reference to FIG. 1.

Figure 1:
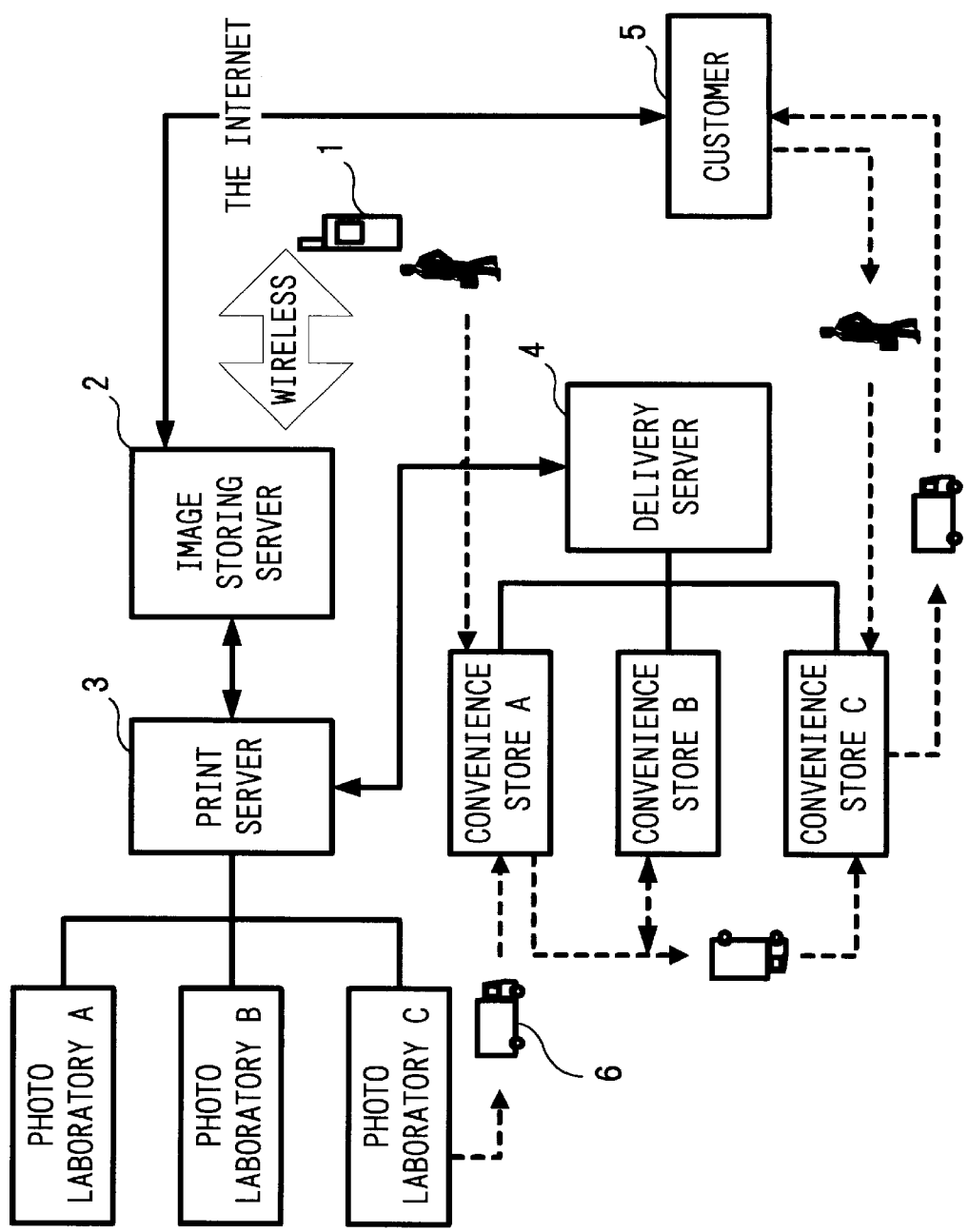
FIG. 1 is an explanatory view of a printing system in accordance with an embodiment of the present invention.

FIG. 1 is an explanatory view of the printing system. The printing system includes cellular phone 1 on which a customer mainly orders prints, image storing server 2 that accepts orders of prints, print server 3, delivery server 4, photo laboratories that perform printing, convenience stores at which customers receives prints, and delivery truck 6. Cellular phone 1 and image storing server 2 can be connected by radio communication and the Internet, thereby transmitting signals each other. Image storing server 2 and print server 3, print server 3 and a photo laboratory, print server 3 and delivery server 4, and delivery server 4 and a convenience store can be connected by the Internet or an intranet, thereby transmitting signals each other. Customer terminal 1 is used for transmitting image data taken by a camera such as a digital camera, or for ordering prints to a photo laboratory. As customer terminal 1, for example, a personal computer capable of communicating with other devices through the Internet, and a cellular phone are used. In this embodiment, a cellular phone is used. Image storing server 2 receives and stores image data transmitted from cellular phone 1. And image storing server 2 transmits image data ordered by a customer to print server 3. Image storing server 2 manages status of the process between ordering and delivering.

Figure 2:
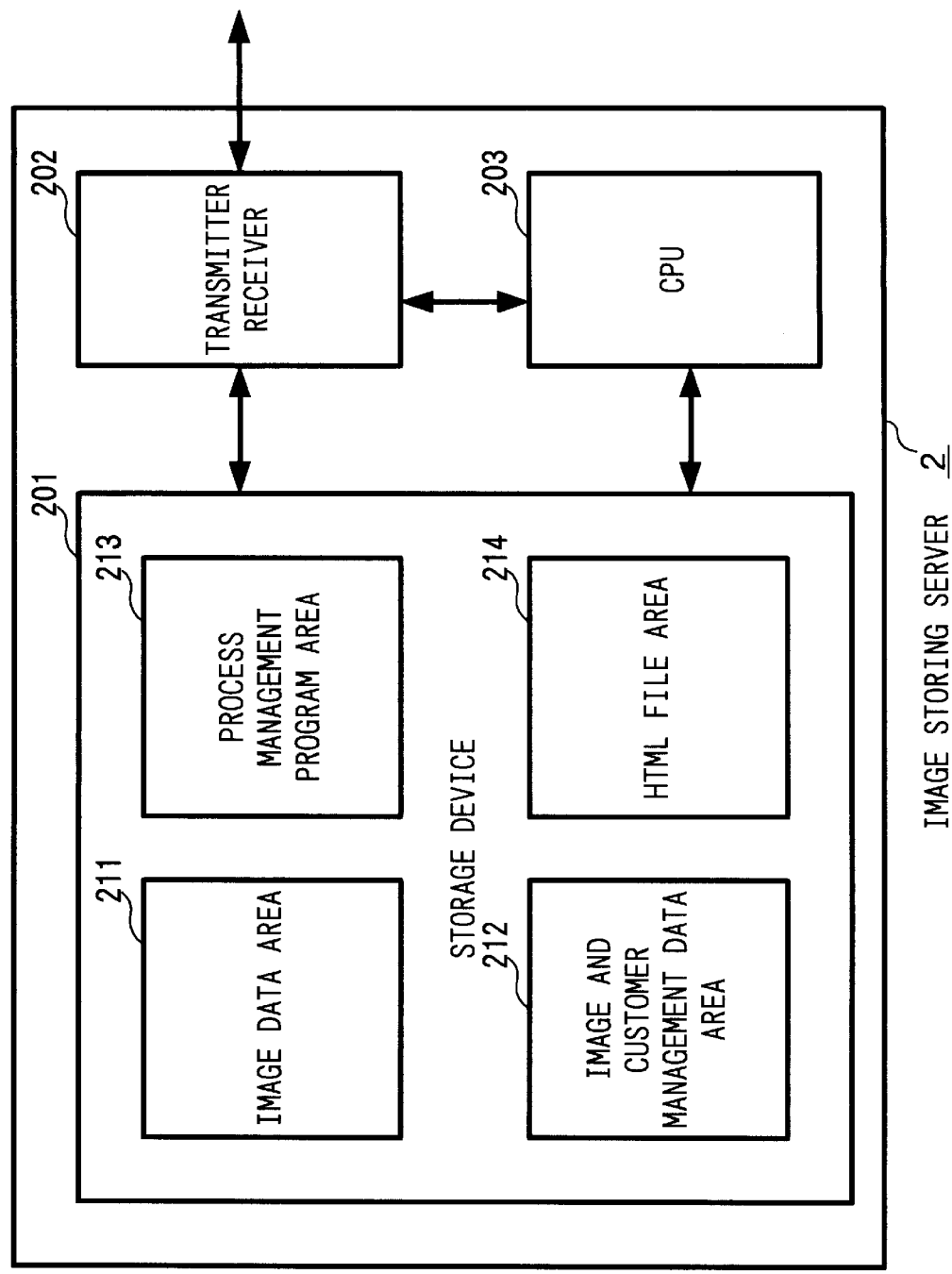
FIG. 2 is a block diagram showing an image storing server.

FIG. 2 is a block diagram showing an image storing server 2. Referring to FIG. 2, storage device 201, transmitter receiver 202, and CPU 203 are connected electrically each other. Storage device 201 includes image data area 211 that stores image data transferred form customer terminal 1, image and customer management data area 212 that stores image and customer management data for managing a corresponding relation between image data and customers, process management program area 213 that stores a program for managing a process between ordering and delivering, and HTML file area 214 that stores screen data displayed on cellular phone 1. Although FIG. 2 is schematically illustrated in a manner that storage device 201 includes four areas, a real circuit is not always the same as the figure. Transmitter receiver 202 sends and receives signals for cellular phone 1 and print server 3. CPU 203 controls all operations of image storing server 2. Print server 3 performs operations managing a plurality of photo laboratories for printing image data. Print server 3 receives orders from image storing server 2 and selects the most suitable photo laboratory among from a plurality of photo laboratories, and determines schedules such as a printing schedule and a delivery schedule of each photo laboratory.

Figure 3:
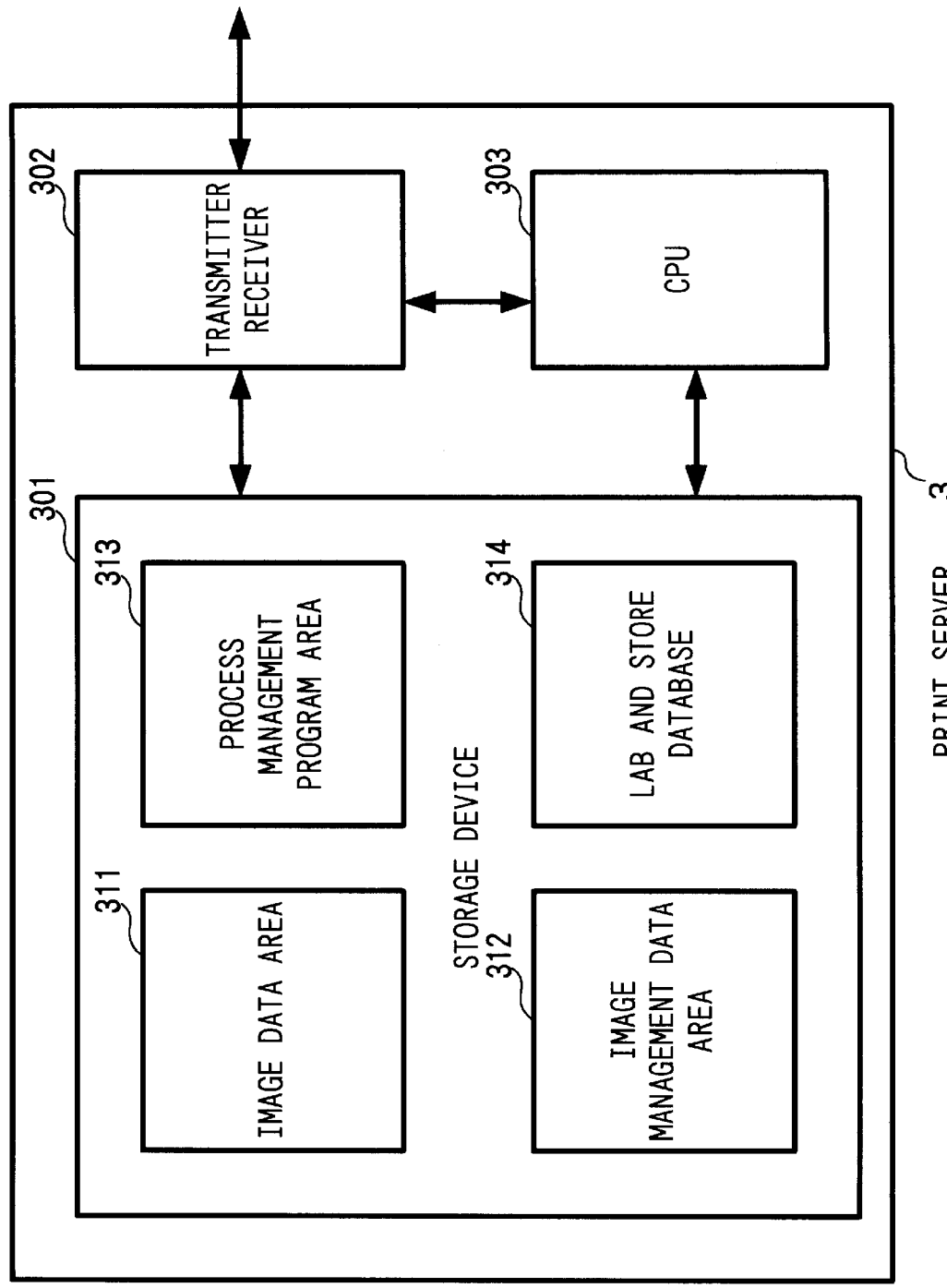
FIG. 3 is a block diagram showing a print server.

FIG. 3 is a block diagram showing a print-server 3. Storage device 301, transmitter receiver 302, and CPU 303 are electrically connected each other. Storage device 301 includes image data area 311 that stores image data transferred from image storing server 2, image management data area 312 that stores image management data for managing image data, process management program area 313 that stores a process management program, and lab & store database area 314 that stores information on photo laboratories and convenience stores. Transmitter receiver 302 transmits to and receives from image storing server 2, delivery server 4, and photo laboratories. CPU 303 controls entire print server 3. In this embodiment, two separate servers, image storing server 2 and print server 3, are used in order to decrease an operation rate of each server, but one incorporated server, which is incorporated image storing server 2 with print server 3, may be used instead of these two servers.

Delivery server 4 transmits a print delivery time schedule, which is transmitted from print server 3, to convenience stores, and transmits information, which is transmitted from convenience stores, to print server 3. In a photo laboratory, its printers print requested images transmitted from print server 3 according to management controlled by print server 3. The printers in the photo laboratory include a laser printer and a jet-ink printer that print digital data images directly, and a silver-halide printer that prints silver-halide images by producing an optical image transformed from digital image data. These prints are delivered to convenience stores by a delivery truck and received by customers. At a convenience store, finished prints are handed to a customer. Prints are transported to a convenience store from a photo laboratory by a delivery truck. Although a convenience store is used as a place where prints are handed to a customer, the present invention is not limited to the convenience store as a receiving place of prints. If receiving of prints is possible, any place is usable. For example, kiosk may be used as a receiving place. In a convenience store, information, such as a print delivery from the photo laboratory and a print receipt by a customer, is entered and transmitted to a server 4.

In such a system configuration, a customer can order printing of images from among image data stored in image storing server 2, or from new image data transmitted from cellular phone 1, using cellular phone 1. And a customer can receive prints, which are printed with high quality at a photo laboratory, at a designated place. Since the process between accepting a print order and delivering prints is performed effectively, a photo laboratory manager or a server administrator can decrease the time necessary for performing this process, and decrease the cost of performing the process.

The following specifically explains a flow from ordering a print to receiving a print in accordance with the present embodiment by referring to figures. FIGS. 4 to 8 are flowcharts showing print order processes performed in a cellular phone 1 and image storing server 2.

Figure 4:
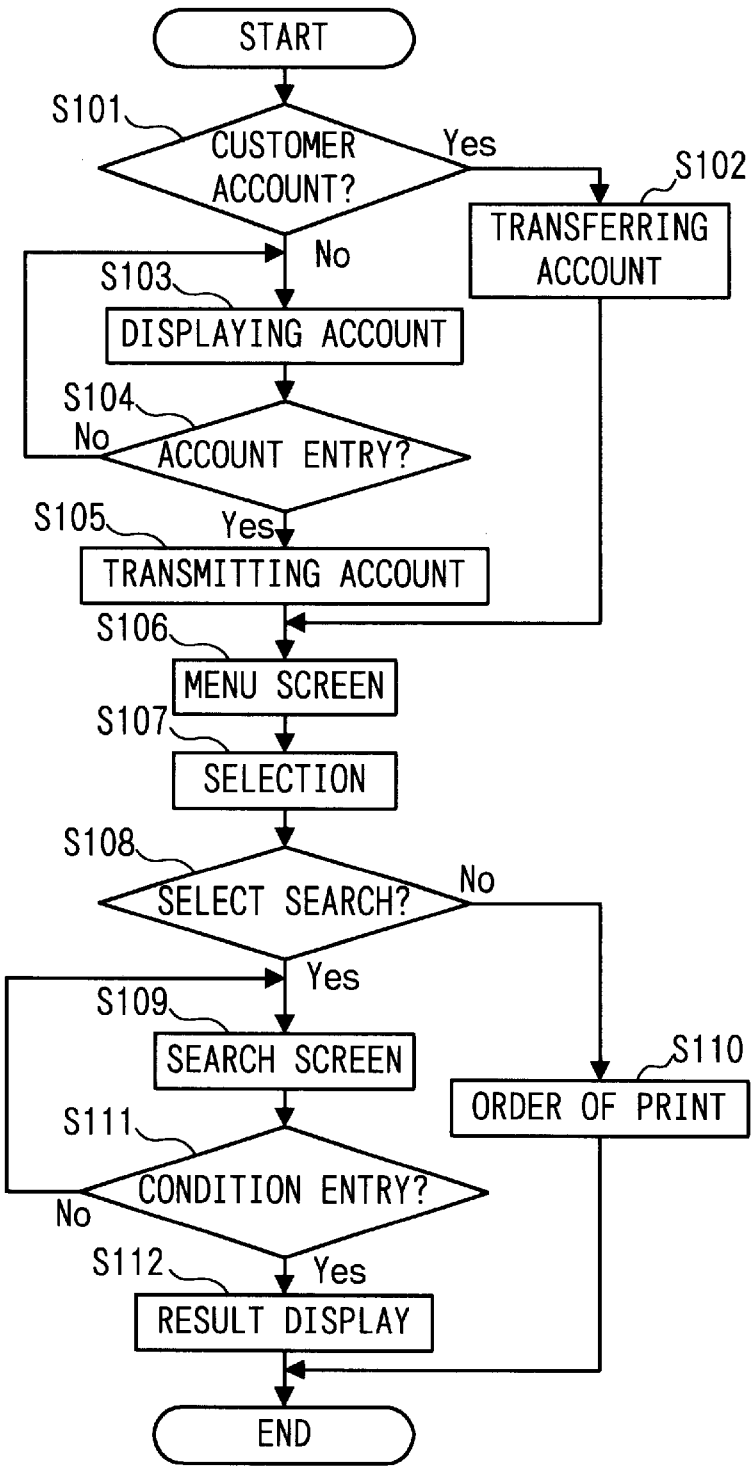
FIGS. 4 to 8 are flowcharts showing print ordering processes performed between a cellular phone and an image storing server.

Referring to FIG. 4, a process performed by cellular phone 1 is explained. When a cellular phone 1 is coupled with image storing server 2, the flow starts. In step S101, it is determined whether cellular phone 1 has customer account information with regard to image storing server 2. If cellular phone 1 has the customer account information, then, in step S103, cellular phone 1 transfers the customer account information to image storing server 2. If cellular phone 1 does not have the customer account information, then, in step S103, cellular phone 1 displays the customer account transferred from image storing server 2. In the case where cellular phone 1 has already been coupled with image storing server 2 through other medium such as the Internet, a customer has a customer ID for signing in. He enters this customer ID on the screen. In step S104, it is determined whether a customer has entered customer account information and has instructed to transfer the customer account information to image storing server 2. If he has entered and instructed, then, in step S105, he transmits the customer account information. If not, the flow returns to step S103. In step S106, cellular phone 1 displays a menu screen transferred from image storing server 2. On a menu screen, there are items of ordering prints or a search service. Instep S107, one of the items, ordering prints and a search service, is chosen. In step S108, it is determined whether the customer has chosen the search service. If he has chosen the search service, then in step S109 cellular phone 1 displays a search service screen transferred from image storing server 2. If not, in step S110, a customer orders prints. In step S109, when a customer enters searching conditions onto the search screen and transfers them to image storing server 2, the search service starts. The search service is such a service in which when a customer enters specific conditions, image storing server 2 determines whether he can receive prints under the conditions. In step S111, it is determines whether the conditions are entered and transferred. If the conditions are transferred, then in step S112 cellular phone 1 displays a search result. If not, the flow returns back to step S109. The conditions include the number of prints, a print size, a convenience store where prints are received, an area of receiving places, and the time of receiving prints. For example, when a customer enters the number of prints and the time of receiving prints, a list of convenience stores meeting the conditions, is displayed. And when he further enters a condition of a receiving area, he can narrow the search for finding adequate convenience stores in the area, and a lost of the convenience stores is displayed on the screen. When a customer enters only the number of prints, a list of convenience stores and the time at which he can receive prints at the convenience store is displayed. When a customer omits a print size, it is deemed that a popular size print is ordered, and a search is performed under the condition. In this search service, the conditions entered in step S111 are transferred to print server 3 through image storing server 2, and the search is performed on print server 3 using the process management program. This is performed in the same manner as a photo laboratory selecting process, as described later.

Figure 5:
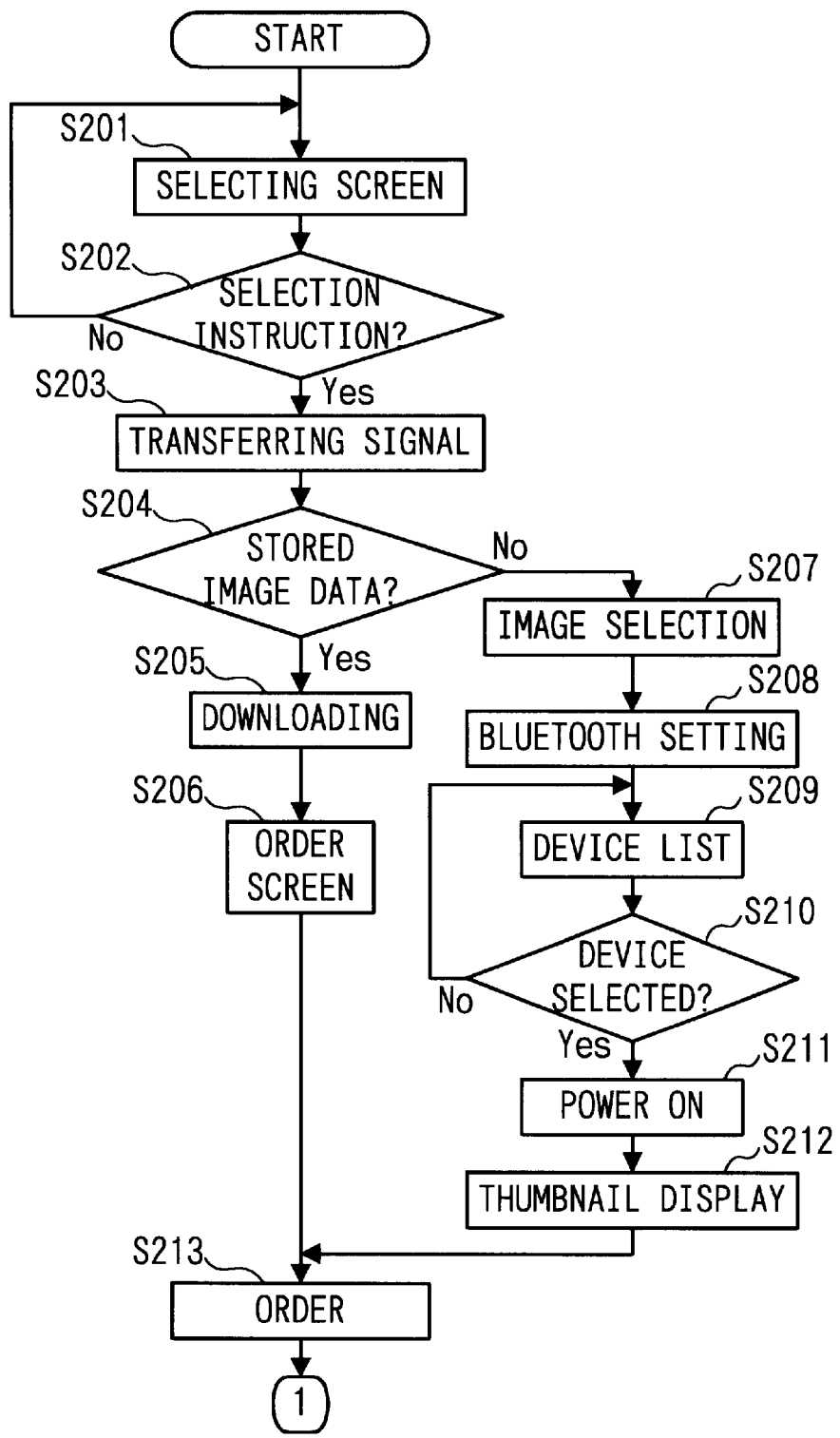
Figure 6:
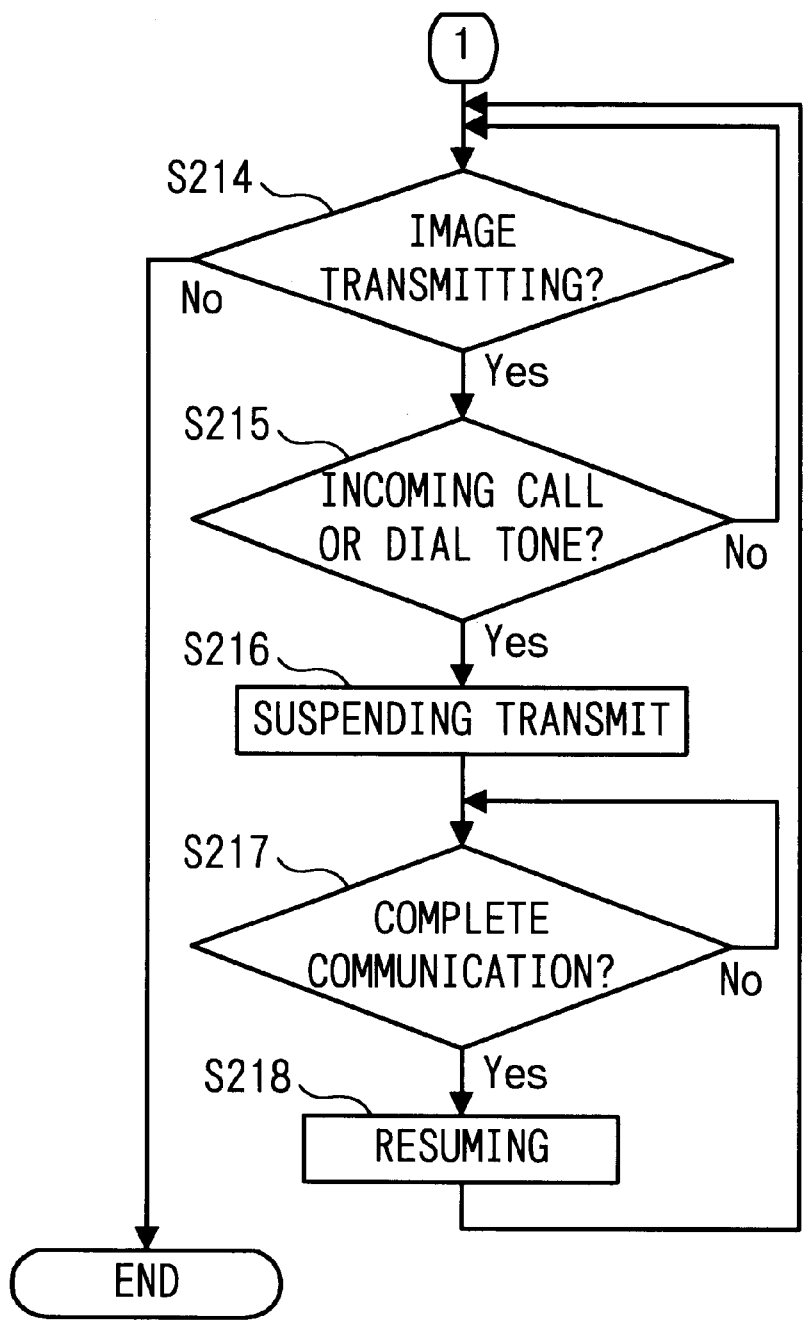
Figure 9:
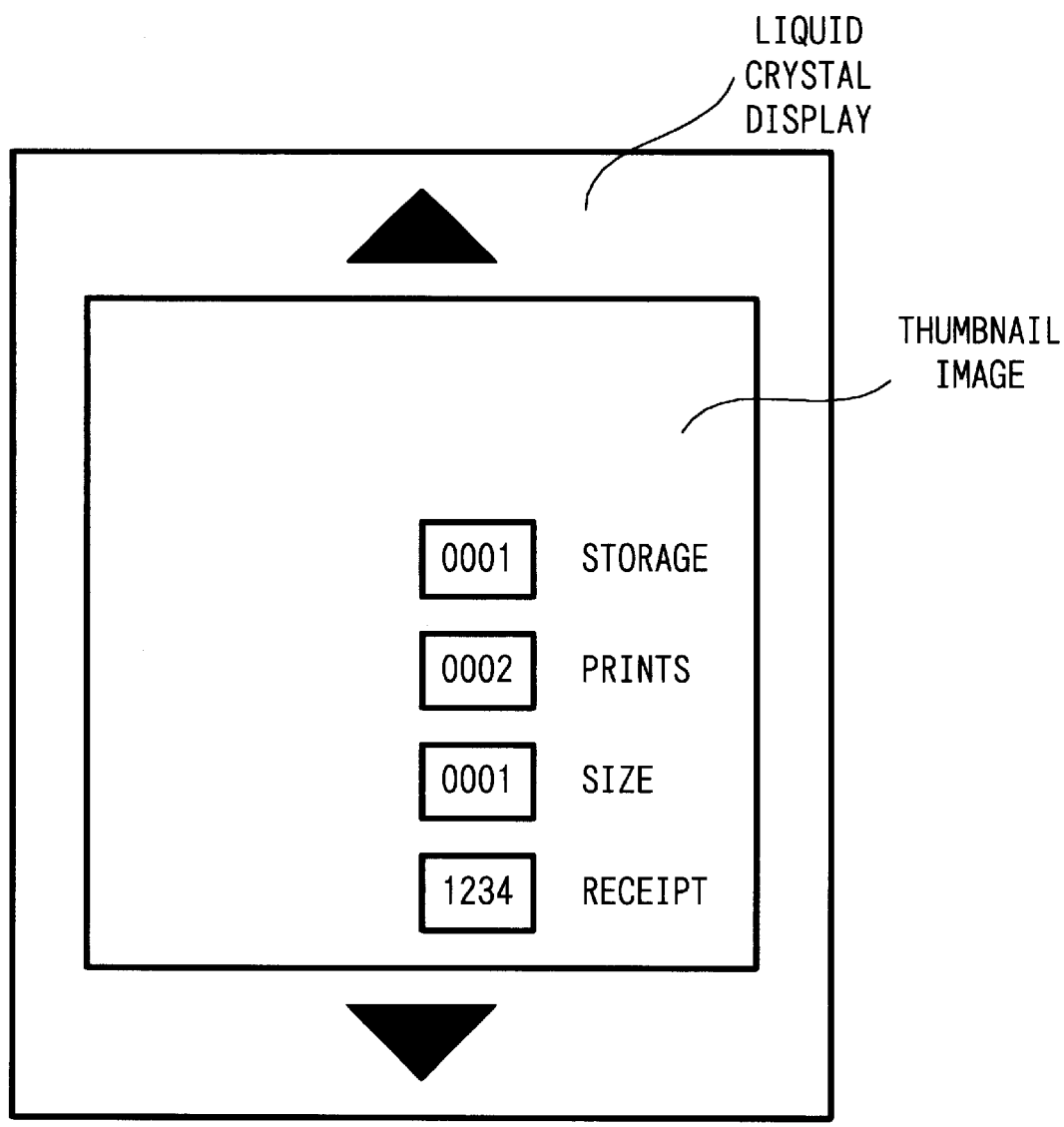
FIG. 9 is a view showing a screen of a cellular phone.

Referring to FIGS. 5 and 6, print ordering process is explained. In step S201, cellular phone 1 displays a screen that asks a customer which image data he selects, one image data is image data stored in image storing server 2, and another image data is image data that will be newly transferred. In step S202, it is determined whether selection and transfer instruction of the image data has been performed. If the selection and transfer instruction has been performed, then in step 203 a signal corresponding to the selection and transfer instruction is transferred to image storing server 2. If the selection and transfer has not been performed, the flow returns back to step S201. Instep S204, it is determined whether stored image data to be printed has been selected. If the stored image data to be printed has been selected, then in step S205 cellular phone 1 receives a thumbnail image of image data stored in image storing server 2, and also receives a screen for ordering a print of the image data. In step S206, a thumbnail image and order condition items are superimposed on the screen, as shown in FIG. 9. If the stored image data to be printed is not selected, in step S207 cellular phone 1 displays a new screen for selecting a new image. At this time, cellular phone 1 receives the screen for ordering prints. The flow hereafter explains one example that a customer orders a print of image data that is stored in a digital camera, which is wirelessly coupled to cellular phone 1 using Bluetooth technology.

When a Bluetooth coupling is set in step S208, in step S209, cellular phone 1 displays the current list of devices capable of being coupled with cellular phone 1 among from Bluetooth devices that already have customer accounts for cellular phone 1. In step S210, it is determined whether a digital camera device has been selected. If a digital camera device has been selected, in step S211 cellular phone is coupled to the digital camera device, and the digital camera is powered on. If a digital camera device has not been selected, the flow returns to step S209, thereby allowing cellular phone 1 to control the digital camera device. In step S212, cellular phone 1 receives a thumbnail image of image data stored in a digital camera, and as shown in FIG. 9, a thumbnail image and order condition items are superimposed. In step S213, information about items, such as "STORAGE", "PRINTS", "SIZE", and "RECEIPT" on an order-screen, is entered and transferred. In the case of a new image data, the image data is transferred along with the information about the items. "STORAGE" has two options, "0000" and "0001". When "0000" is optioned, image data will not be stored in image storing server 2, or the image data will be eliminated when the image data is already stored. When "0001" is optioned, image data will be stored in image storing server 2. "PRINTS" means the number of prints, and an entered number of prints are printed. "SIZE" means a print size, for example, "0001" indicates a popular size of a print. "RECEIPT" means a receiving place where a customer receives prints, and a code number corresponding to this place is entered. In step S214, it is determined whether image data and print order data are being transmitted. If they are not being transmitted, this flow ends. If they are being transmitted, in step S215, it is determined whether there has been an incoming call or a dial tone. If there has been an incoming call or a dial tone, in step S216, transmitting of the image data and the order data is suspended, leaving cellular phone 1 anytime ready to resume transmitting the data from a suspended point. If there has not been an incoming call or a dial tone, the process returns back to step S214. In step S217 it is determined whether communication has ended. If communication has ended, in step S218, cellular phone 1 resumes transmitting the image data and order data from the suspended point, and returns back to step S214. If communication has not ended, cellular phone 1 repeats step S217. When this flow ends, print ordering process is completed.

Figure 7:
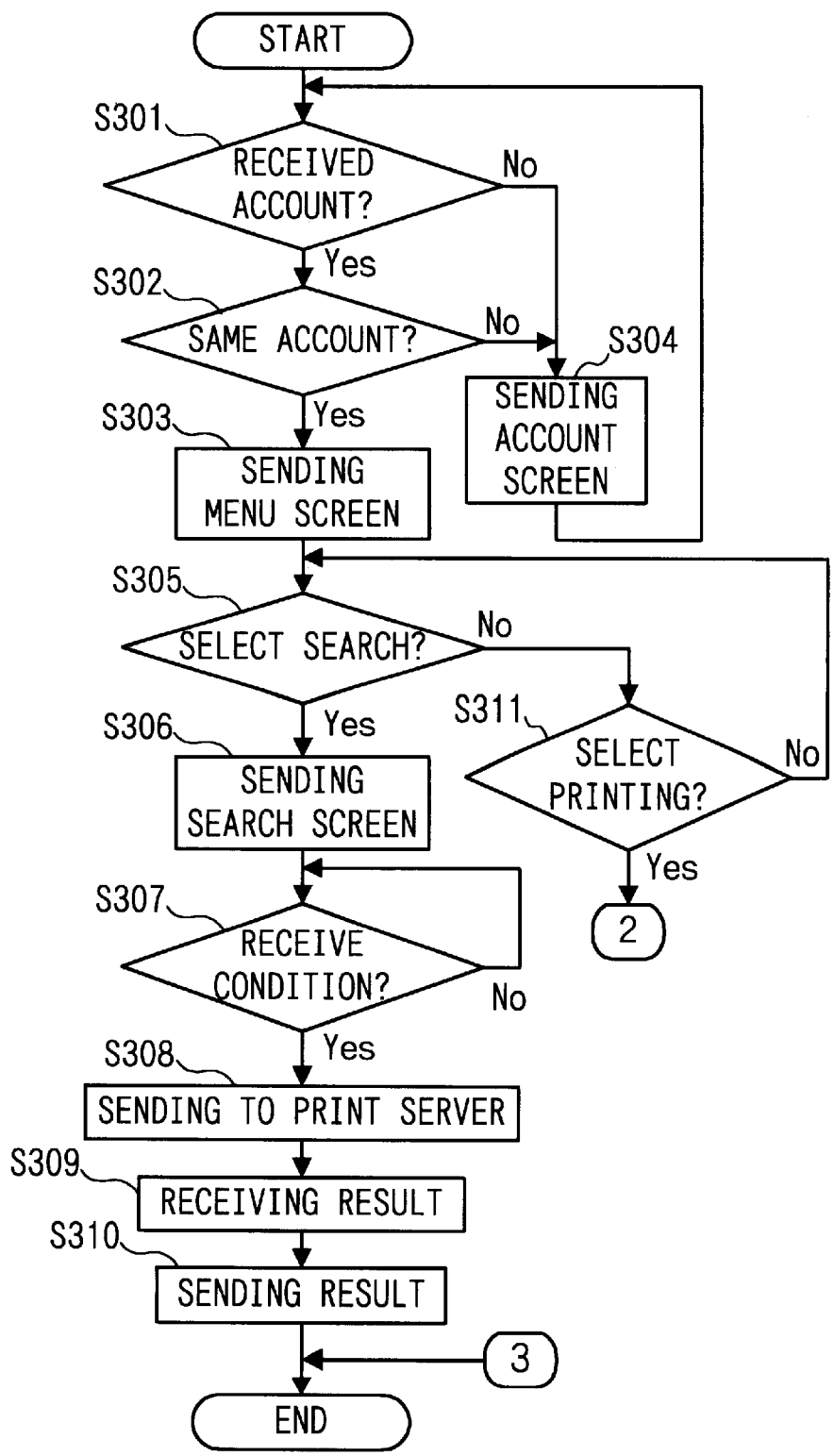
Figure 8:
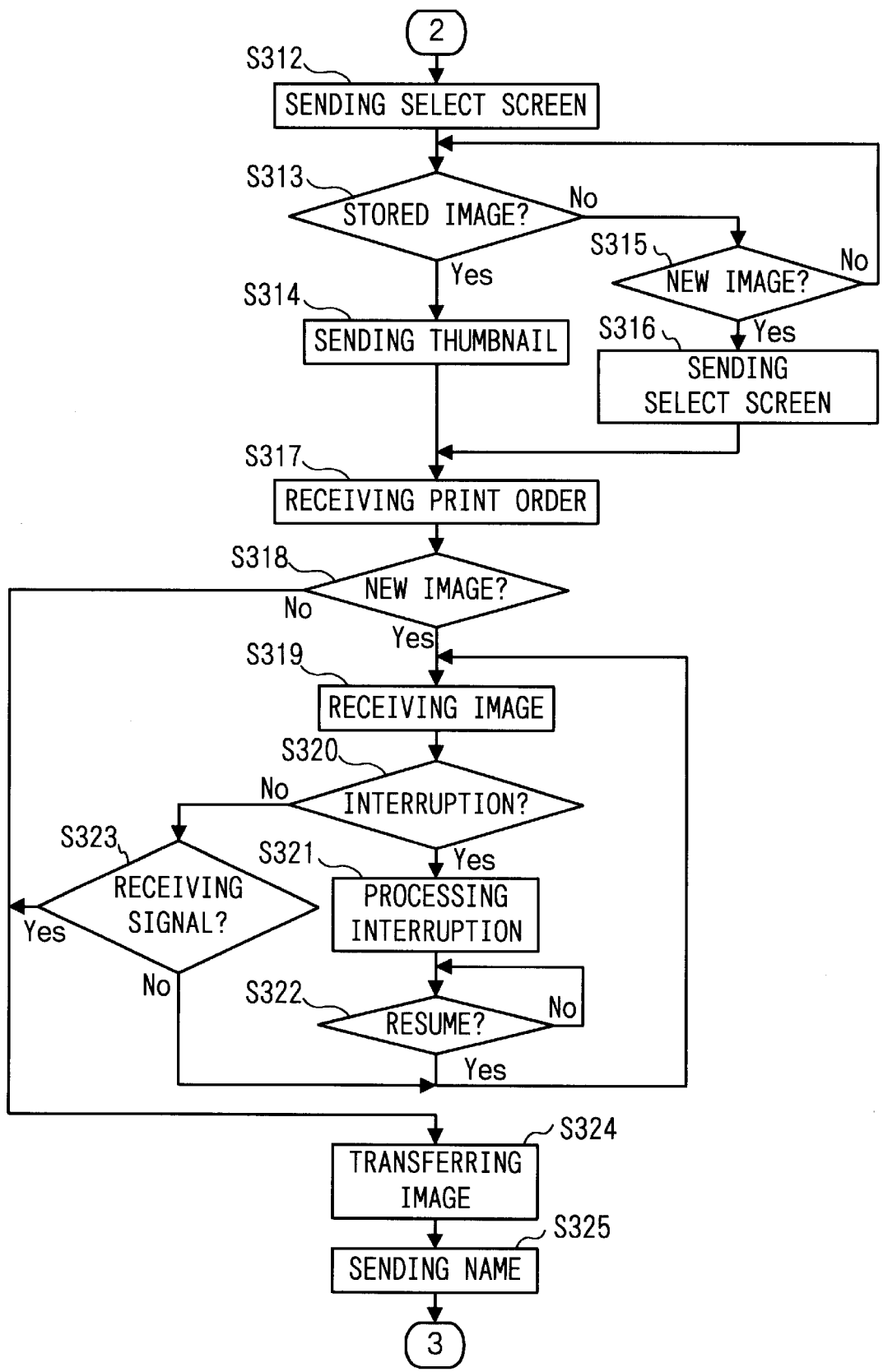

Referring to FIGS. 7 and 8, a process that image storing server 2 performs is explained. Flows of FIGS. 7 and 8 start when image storing server 2 is coupled to cellular phone 1. In step S301, it is determined whether image storing server 2 has received customer account information. If image storing server 2 has received customer account information, in step S302, the server searches the same account that could be stored in the server. If there is the same account, in step S303, image storing server 2 sends a menu screen to cellular phone 1. If there is not the same account, or the account has not been sent yet, in step S305, the server sends a customer account registering screen to the phone. In step S305, it is determined whether image storing server 2 has received a signal generated by selecting the search service on the menu screen. If the server has received the signal, instep S306, the server sends a search service screen to cellular phone 1. In step S307, it is determined whether the server has received condition information entered on the service screen. If the server has received them, in step S308, image storing server 2 sends the received condition information to print server 3. In step S309, image storing server 2 receives photo laboratory information searched based upon the condition information on printer server 3. In step S310, image storing server 2 sends the searched photo laboratory information, received from print server 3, to cellular phone 1. If it is determined that image storing server 2 has not received a signal in step S305, the process continues to step S311, and it is determined whether image storing server 2 has received a signal generated by selection of print ordering on a menu screen. If image storing server 2 has received the signal, the process continues to step S312, and the server sends a print selecting screen to cellular phone 1. If image storing server 2 has not received the signal, the process returns back to step S305.

In step S313 if image storing server 2 has received a signal generated by selecting a print of stored image data, in step S314, the server sends a thumbnail image of the image data corresponding to a customer account information, along with a ordering screen to be superimposed on the thumbnail image. Since this thumbnail image is viewed on a liquid crystal display of cellular phone 1, a smaller thumbnail image in pixel than that on a personal computer is sent to cellular phone 1. In step S313, if image storing server 2 has not received a signal generated by selecting a print of stored image data, when the server receives a signal generated by selecting a print of new image data instep S315, the process continues to step S316, and when the server does not receive the signal, the program returns back to step S313. In step S316, the server sends an image selecting screen and an ordering screen to cellular phone 1.

In step S318, image storing server 2 confirms whether a new print order of image data has been ordered, after order information has been sent to the server in step S317. If a print order of new image data has not been ordered, the process continues to step S324. Instep S324, image storing server 2 transfers the ordered image data and the order information to print server 3. If a print order of new image data has been ordered, image storing server 2 receives the image data in step S319. In step S320, image storing server 2 confirms whether it has received an interruption signal instructing the sever to stop receiving the image data and the order data. If the server has received the signal, the server, in step S321, performs an interruption process where receiving of the image data is interrupted and the server is left ready to resume receiving the image data from an interrupted point anytime. By performing the interruption process, the server can incorporate the data before interruption with the data after connection, seamlessly. In step S322, image storing server 2 determines whether signal receipt has been resumed. If the signal receipt has been resumed, the server receives the image data in step S319. If the server does not receive the image data, it waits for resumption, repeating step S322.

In step S320, if image storing server 2 has not received an interruption signal, the process continues to step S323. In step S323, it is determined whether the server has received the signal. If the server has received the signal, the process continues to step S324. In step S324, image storing server 2 transfers the ordered image data and the order information to print server 3. In this case, when image storing server 2 receives an order of new image data, the server instructs print server 3 to print images after receiving whole new image data. When a print order includes both of stored image data and new image data, image storing server 2 transfers both of the image data to print server 3 after receipt of the new image data has been completed. In step S324, image storing server 2 classifies images into three categories using the received order information. These images are images to be only stored, images to be only printed, and images to be stored and printed. Image data to be only stored is allocated to a predetermined folder in a customer folder within image storing server 2. Image data to be only printed is transferred to print server 3. Although this image data is stored temporarily in image storing server 2, they are eliminated from the server after confirmation that a customer has received prints. The reason for storing the image data temporarily in storing server 2 is that the image could be crushed during the period between the time when the image data is started to be transferred to storing server 2, and the time when printing is finished. By storing the image data temporarily in image storing server 2, it is possible to avoid letting a customer send image data again. With regard to the image data to be stored and printed, image storing server 2 stores them and transfers to print server 3. And image data is not eliminated after being printed. In general, every time image storing server 2 receives an order, image storing server 2 stores receipt of print order and the number of prints, coupled with ordered image data. In step S325, image storing server 2 sends the clerk's name who accepted the order. After that this process ends.

The following explains control performed in print server 3. When image data is transferred to print server 3 from image storing server 2, print server 3 transforms a format of the transferred image data into the DPOF (Digital Print Order Format) format in which print information, such as the number of prints, can be added to the image data. And print server 3 adds the number of prints to the image data. By using the DPOF format, a printer of a photo laboratory does not need to set complex conditions, because the photo lab printer can automatically set the number of prints in the DPOF format. In the case where an original image data already has the number of prints written in DPOF format, and a customer orders a new print order of the same image data, the original number of prints is replaced to the new number of prints. This is because the new number is the more possible number that a customer desires.

Figure 10:
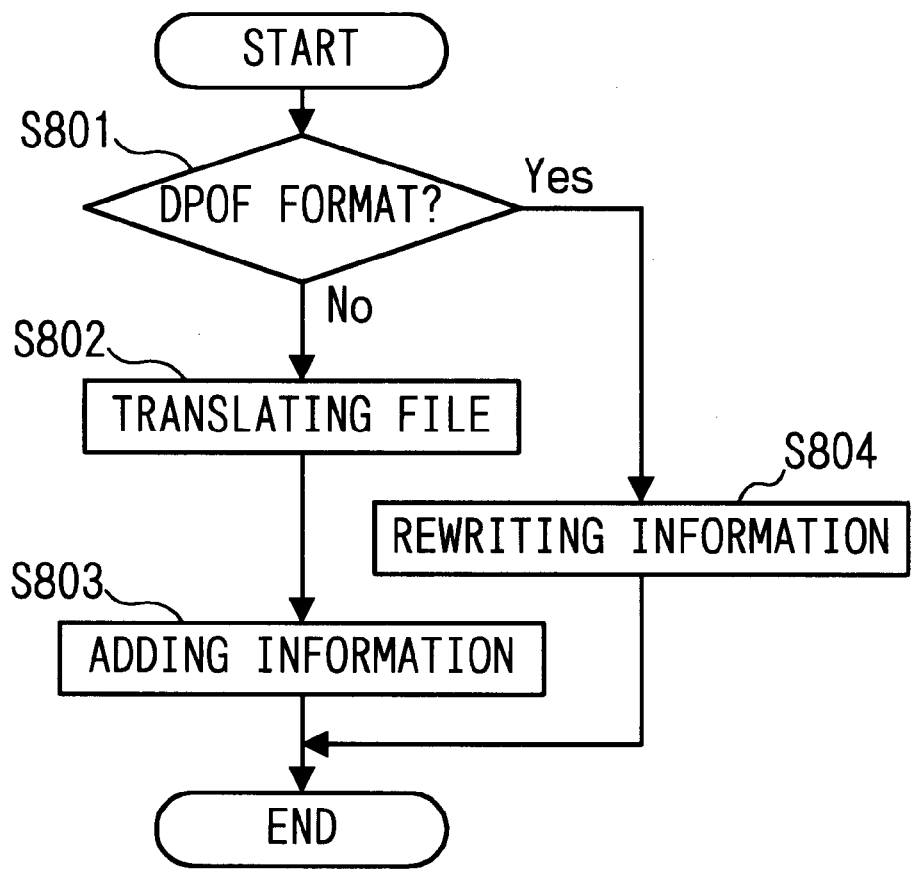
FIG. 10 is a flowchart showing a process that performs file translation and rewriting of added information.

FIG. 10 is a flowchart showing a process that performs translating of a file and rewriting of added information. Referring to FIG. 10, the process starts when print server 3 receives image data from image storing server 2. In step S801, it is determined whether received image data is written in DPOF format. If the received image data is written in DPOF format, the process continues to step S804. In step S804, print server 3 replaces the original number of prints with the newly ordered number of prints. If the received image data is not written in DPOF format, the process continues to step S802. In step S802, the received image data is translated into image data of the DPOF format. And in step S803, the translated number of prints is added to the image data of the DPOF format, as DPOF format information. And this routine, in which translation and rewriting of a file are performed, ends.

The following explains management of printing and print delivering, performed on print server 3. Print server 3 automatically selects a photo laboratory, in which image data is printed, using a process management program, and transfers images to the photo laboratory. In this process management program, the automatic selection of the photo laboratory is based upon information about the number of prints added to image data, information about a receiving place where a customer receives prints, information about receiving time when a customer receives prints, information about operating status of each photo laboratory printer, and running status of a delivery truck.

Figure 11:
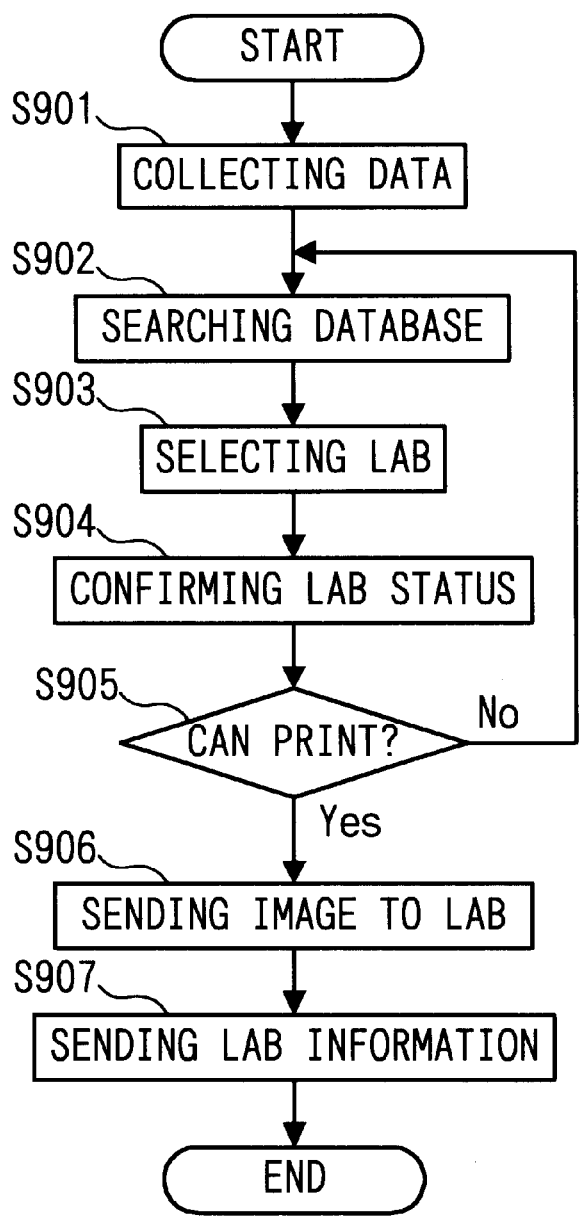
FIG. 11 is a flowchart showing a process performing automatic selection of a photo laboratory that performs printing.

FIG. 11 is a flowchart showing a process performing automatic selection of a photo laboratory. Referring to FIG. 11, the process starts when print server 3 has received image data and order information. In step S901, print server 3 collects data necessary for selecting a photo laboratory among from received order information. In step S902, print server 3 searches a photo laboratory that meets the receiving place condition obtained in step S901, based upon a database of convenience stores (receiving places) and photo laboratories. When printer server 3 has selected a plurality of photo laboratories that meet the conditions in step S903, in S904, printer server 3 selects a photo laboratory where its current loads are small and incoming loads will be small, based upon resulting information in the past operation. This allows print server 3 to determine an adequate photo laboratory. In step S905, it is determined whether the selected photo laboratory can process prints as necessary. If the selected photo laboratory can process prints as necessary, print server 3 transfers image data to the selected photo laboratory. If the selected photo laboratory cannot process them, the process continues to step S902. In step S902, a photo laboratory is selected again. In step S907, print server 3 transfers selected photo laboratory information, the hour that printing has been completed, and the hour that delivery has been performed, to image storing server 2. And print server 3 also transfers information about a convenience store and the hour to deliver prints to a convenience store, to print server 4. Even after transferring image data to a photo laboratory, print server 3 holds image data and keeps it until print processing is completed (until the photo laboratory has confirmed that customer received prints). This allows a photo laboratory to avoid such a trouble as a customer or image storing server 1 must send the image data again, if the photo laboratory should loose the image data.

Figure 12:
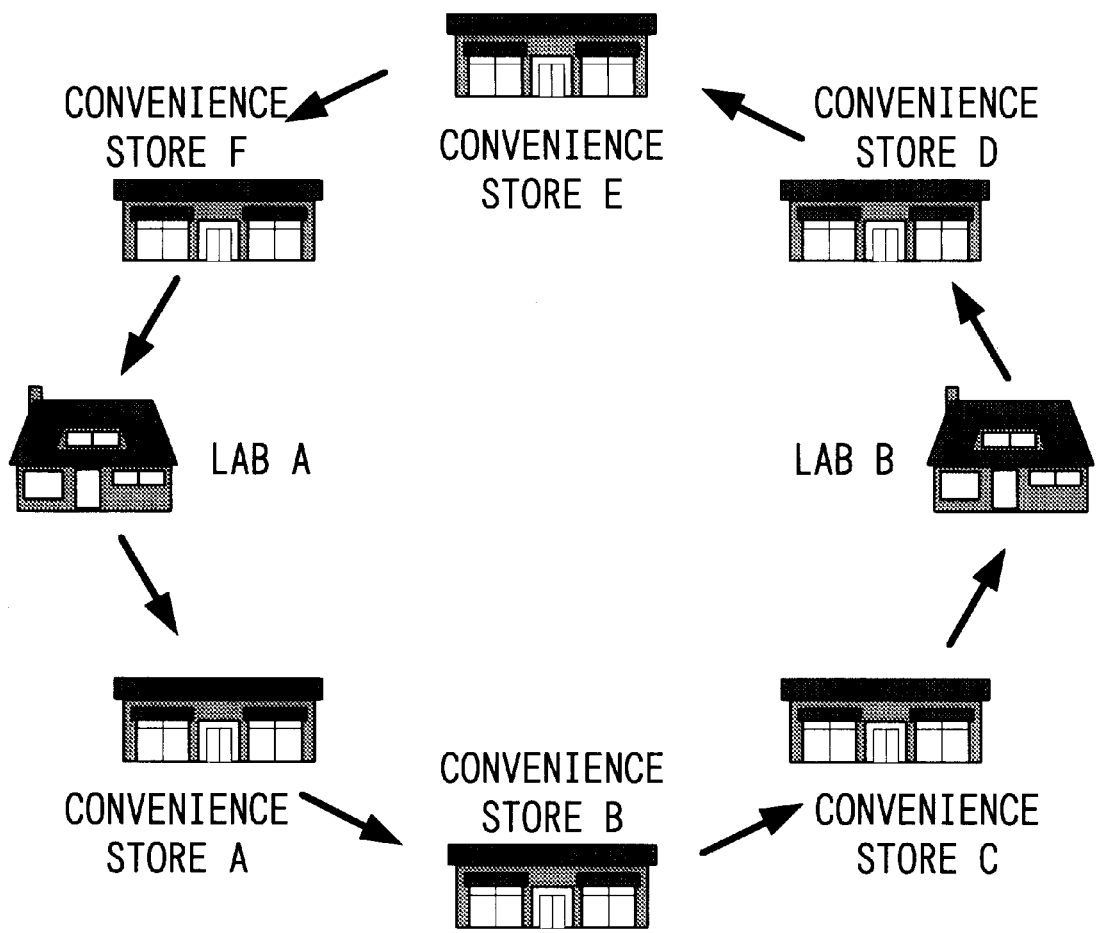
FIG. 12 is a view explaining that a delivery truck delivers prints to convenience stores by making the rounds of an area where a plural of laboratories and convenience stores exist.

The following specifically explains the automatic processing as illustrated in FIG. 11, using FIG. 12. FIG. 12 is a view explaining that a delivery truck delivers prints to convenience stores by making the rounds of an area where a plural of photo laboratories and convenience stores exist. A delivery truck makes rounds in order, for example, through a photo laboratory A, convenience store A, convenience store B, convenience store C, photo laboratory B, convenience store D, convenience store E, convenience store F, and photo laboratory A. In this case, if image data is transferred to one of photo laboratory A and B, the truck can deliver prints to any convenience store. Therefore, in step S902 of FIG. 11, two photo laboratories are selected. It is necessary to make operations between printing and delivering efficient. Therefore, when a customer designates one of convenience stores A, B, and C as a receiving place, image data must be transferred to photo laboratory A and printed there. And, likewise, when a customer designates one of convenience stores D, E, and F as a receiving place, image data must be transferred to photo laboratory B and printed there. In step S904, a photo laboratory is selected by considering workload status of the photo laboratory and delivery running status of the delivery truck, as follows. Even if convenience store A is designated as a receiving place by a customer, when it is determined that prints will not be completed in time because of heavy load for printers of photo laboratory A, print server 3 transfers image data to photo laboratory B, and prints are printed in photo laboratory B and transported to convenience store A. Print server 3 also controls an order of image data printed in a photo laboratory.

Figure 13:
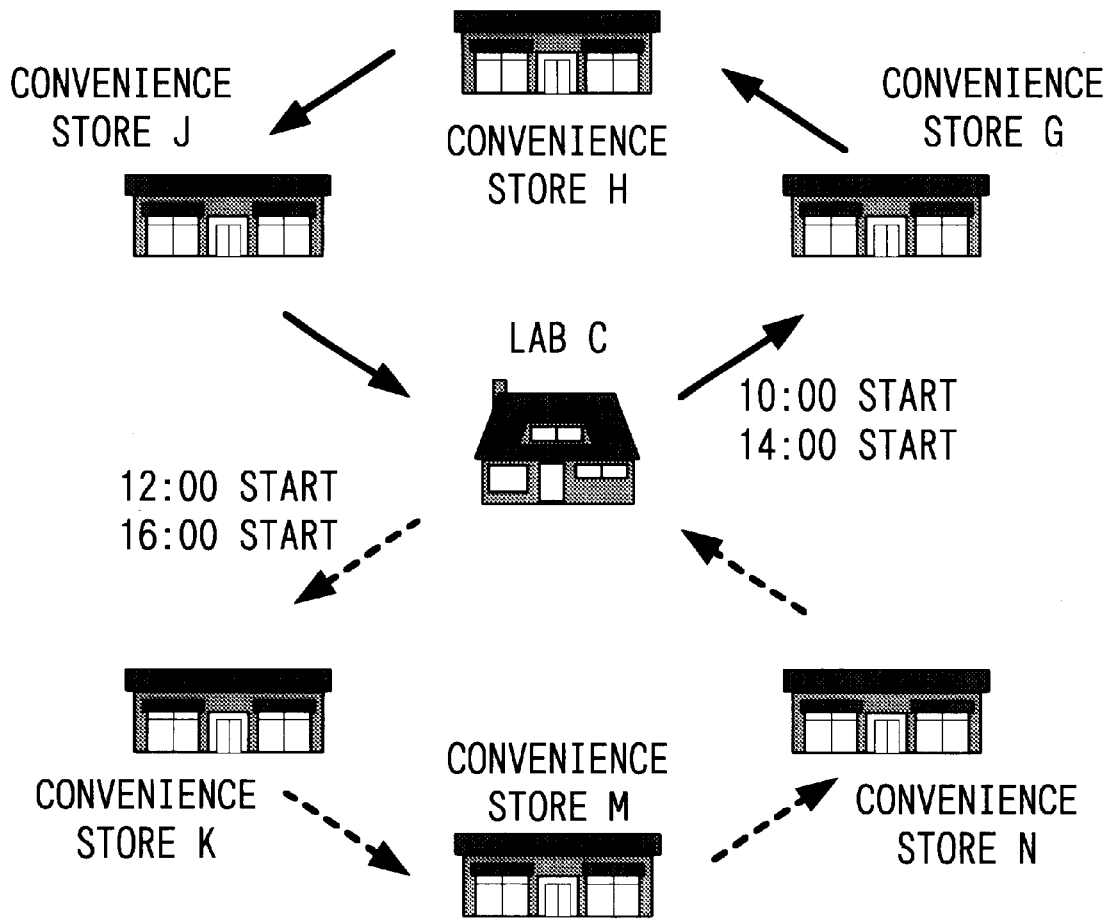
FIG. 13 is a view illustrating a delivery manner in which a delivery truck delivers prints from a photo laboratory to a plurality of convenience stores.

FIG. 13 is a view illustrating a delivery manner in which a truck delivers prints from one photo laboratory to a plurality of convenience stores. In this delivery manner, prints printed in photo laboratory C are delivered to convenience stores G, H and J by a delivery truck that starts at 10 o'clock and 14 o'clock. A delivery truck that starts at 12 o'clock and 16 o'clock delivers prints to convenience stores K, M, and N. In such a delivery manner, it is possible to deliver prints more efficiently by controlling the printing order of image data. For example, there is the following case; one print order is accepted at 13:20 p.m. under condition that a delivery truck must start at 16:00 at the latest, and a receiving place is convenience store M. And another print order is accepted at 13:30 p.m. under condition that a delivery truck must start at 14:00 at the latest, and a receiving place is convenience store J. If the order accepted at 13:20 p.m. is treated first, the order accepted at 13:30 p.m. may not be in time for the delivery truck of 14:00 p.m. start.

Since the prints of the order accepted at 13:20 p.m. may be delivered by the delivery truck of 16:00 p.m. start, the order accepted at 13:30 p.m. can be treated first. Thus, by adjusting the printing order of prints in a manner that prints may be printed in time for a specific truck delivery, it is possible to control the printing of prints more efficiently. The following explains the control of printing, using a flowchart.

Figure 14:
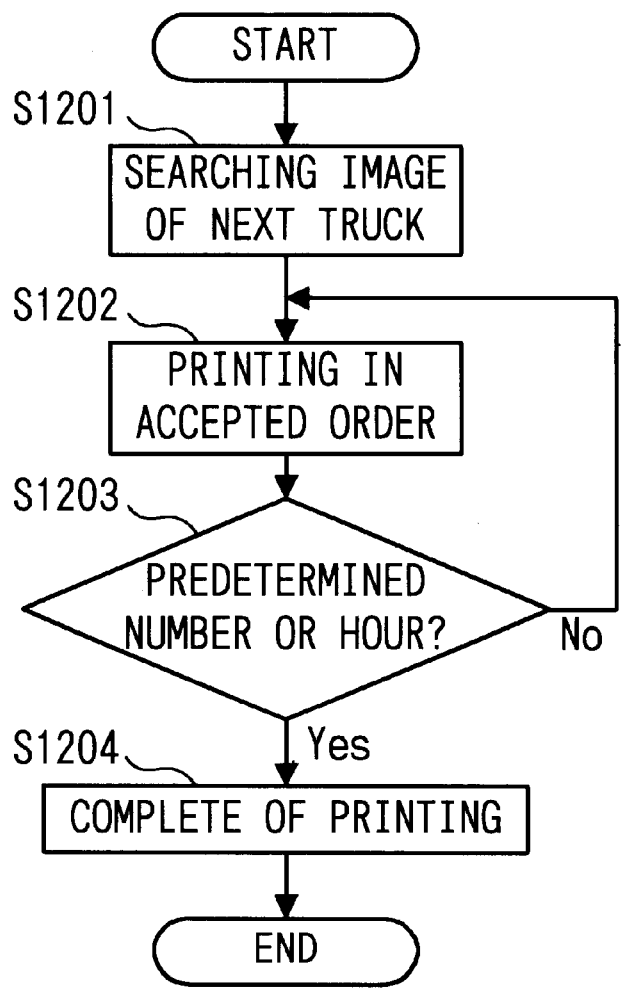
FIG. 14 is a flowchart showing a process that controls a printing order of image data in a photo laboratory.

FIG. 14 is a flowchart showing a process that controls a printing order of image data in a photo laboratory. Referring FIG. 14, it is possible to print prints efficiently by considering a delivery truck timetable. In step S1201, print server 3 searches image data of which prints are delivered to receiving places within the area where the coming delivery truck makes rounds. In step S1202, prints are printed in accepted order. In step S1203, print server 3 determines whether the number of prints, which must be delivered by the truck, has reached the predetermined number, or whether the hour has reached the predetermined hour. If the number of prints has reached the predetermined number, or the hour has reached the predetermined hour, the process continues to step S1204. In step S1204, print server 3 stops current printing. And this flowchart ends. The reason why print server 3 stops printing when the predetermined number of prints or the predetermined hour has been reached is to avoid the state where prints to be delivered cannot be transported by the coming truck, and to avoid the state where departure of the current delivery truck becomes late. When printing is completed in step S1204, the process returns back to step S1201, and continues the present flow during business hours. The following explains a system corresponding to a business in which a photo laboratory company gains advertising rates. In this business, the photo laboratory company gains advertising rates by inserting an advertising print into customer's prints.

For example, there is a camera maker that advertises in the above-business. The digital camera maker inserts a print of which picture was taken by its digital camera, thereby appealing good quality of its picture and capable of promoting digital cameras. The following explains a system capable of realizing the above-business.

Figure 15:
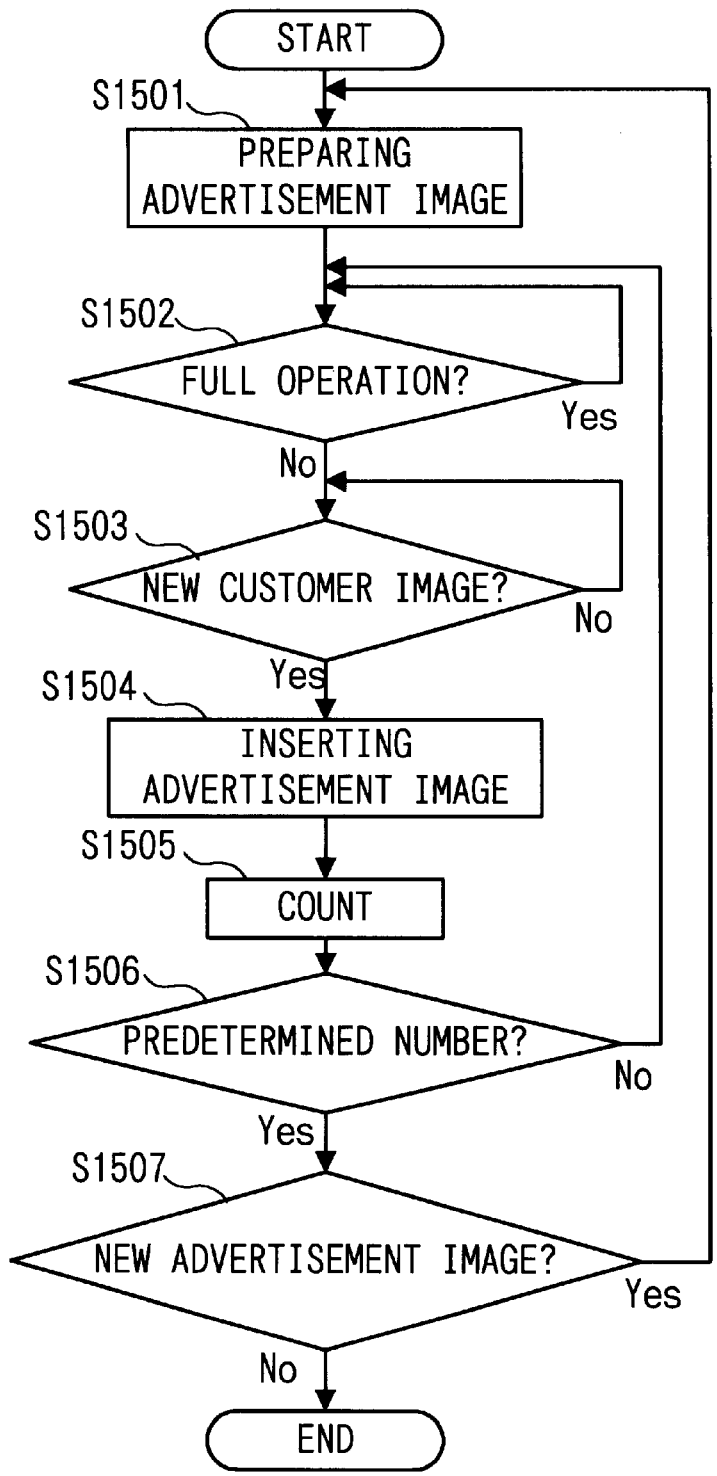
FIG. 15 is a flowchart showing control performed in a print server.

FIG. 15 is a flowchart showing control performed in print server 3. When image storing server 2 receives image data of advertisement from a company that wants to insert an advertising print, this flow starts. In step S1501, advertisement image data is prepared. In step S1502, print server 3 determined whether a printer is in full operation. If the printer is in full operation, the process returns back to step S1502 and continues the step. If printing is performed in full operation of the printer, print delivery becomes late, deteriorating service quality. If the printer is not in full operation, the process continues to step S1503. In step S1503, print server 3 determines whether image data to be transferred to the printer has been changed to image data of a new customer. If the image data to be transferred has been changed, the process continues to step S1504. In step S1504, advertisement image data is transferred to the printer before the image data of a new customer is transferred. In this case, the advertisement print is placed top of customers stacked prints. If the image data to be transferred has not been changed, the operation in step S1503 is repeated. In step S1505, the number of advertisement prints is counted. In step S1506, print server 3 determines whether the number of advertisement prints has reached the number ordered by a company. If the number of the advertisement prints has not reached, the process returns back to step S1501. If the number of the advertisement prints has reached, the process continues to step S1507. In step S1507, print server 3 determines whether new advertisement prints are requested. If new advertisement prints are requested, advertisement image data is changed to new advertisement image data. If new advertisement prints are not requested, the present flow ends.

By using the above advertisement method, it is possible for a company to make an advertisement cost cheaper than a direct mail cost because delivery charge is not necessary. In particular, in the case where a digital camera maker wants advertisement, the maker can make an efficient advertisement because a customer is a user of a digital camera. And, at the same time, a photo laboratory can show quality of printing. Even if quality of customer's print is not good, it is possible to let a customer realize that the reason for bad picture quality is because of camera's bad image quality. In the present embodiment, though a convenience store is independent from a photo laboratory, it is possible to install a photo laboratory system in a convenience store. The convenience store manages the photo laboratory system and delivers prints to other convenience stores. In the system of the present embodiment, image storing server 2 manages print server 3 and another photo laboratory equipment altogether. But image storing server 2, print server 3, and a photo laboratory could be managed by different companies. A company managing image storing server 2 gains a margin from a company managing print server 3 according to the number of prints. A company managing print server 3 gains a margin from a photo laboratory. It is also possible that a company managing image storing server 2 collects money from customers, and after the company subtracts a margin from the money, the company sends the rest of the money to a company managing print server 3. Furthermore, it is possible to collect customers in conjunction with a service provider. The service provider gains a margin when prints are ordered through the service provider. Since this allows the service provider to decrease a connecting charge (free charge), customers utilizing this service provider will increase, and print orders also will increase.

Second Embodiment

Figure 16:
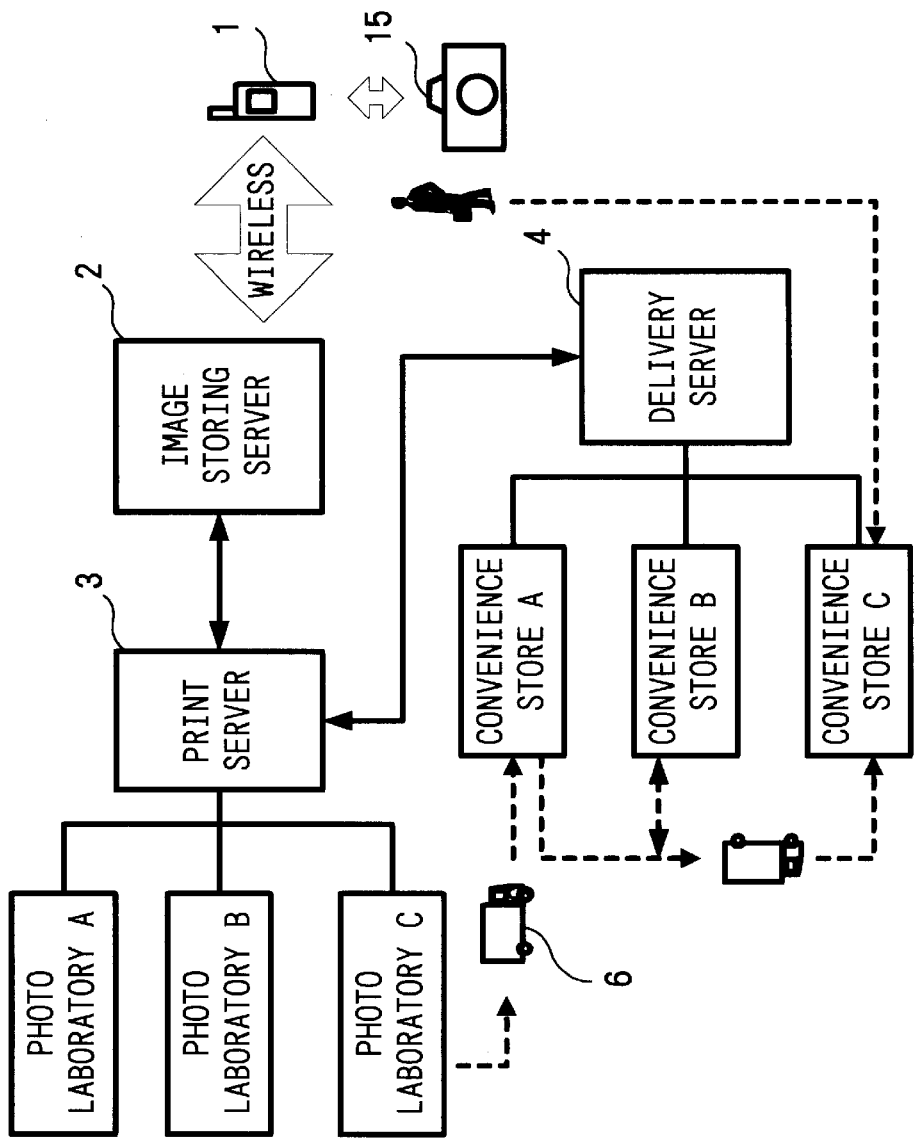
FIG. 16 is an explanatory view showing a printing system in accordance with one embodiment of the present invention.

The following explains a second embodiment of the present invention. FIG. 16 is an explanatory view showing a printing system in accordance with one embodiment of the present invention. It should be noted that description will be made on the arrangements of the second embodiment of the present invention shown in FIG. 16 which are different from those of the first embodiment shown in FIG. 1, and common arrangements to the two embodiments are given the same referential numerals and description thereof will be omitted.

Referring to FIG. 16, the printing system includes digital camera 15 for taking a picture and capturing image data, cellular phone 1 for ordering a print, image storing server 2 for receiving a print order, print server 3, delivery server 4, a photo laboratory for performing printing, a convenience store where a customer receives prints, and a delivery truck 6 for delivering prints running between the photo laboratory and the convenience store. Cellular phone 1 is connected with image storing server 2 through a service provider via the Internet and radio communication. Cellular phone 1 communicates with image storing server 2 and vice versa. Image storing server 2 and print server 3, print server 3 and a photo laboratory, print server 3 and delivery server 4, and delivery server 4 and a convenience store are connected via intranet or the Internet, and communicate with each other. Cellular phone 1 transfers image data captured by digital camera 15, and orders a print that will be printed in a photo laboratory. Cellular phone 1 has a Bluetooth circuit for communicating with other devices with wireless communication. Digital camera 15 takes a picture and stores the captured image data into memory within digital camera 15. Digital camera 15 has a Bluetooth circuit for communicating with other devices with wireless communication. Digital camera 15 can communicate with cellular phone 1 with wireless communication using the Bluetooth technology.

Figure 17:
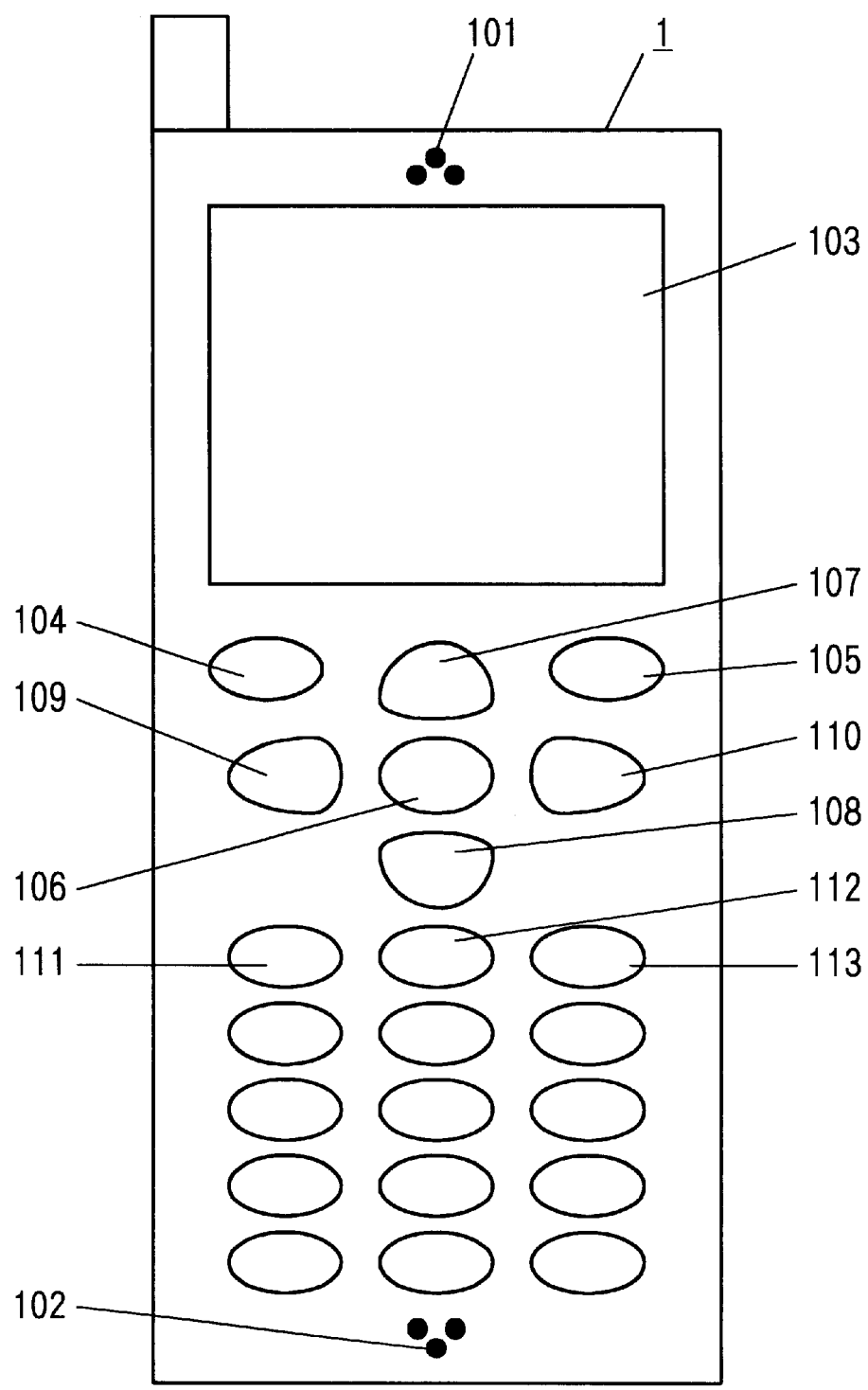
FIG. 17 is an external view showing a cellular phone.

The following explains cellular phone 1. FIG. 17 is an external view showing a cellular phone 1. Referring to FIG. 17, cellular phone 1 includes speaker 101, microphone 102, display 103, and a plurality of buttons. Speaker 101 and microphone 102 are used during talking on the phone. And display 103 and a plurality of buttons are also used during talking on the phone. Menu button 104 is used for displaying a menu screen. Connection button 105 is used for connecting cellular phone 1 with an external device. Pushing this button displays a list of accessible devices on display 103. Implementing button is used for decision and implementation of optional items on a screen such as menu. Up direction button 107, down direction button 108, right direction button 109, and left direction button 110 are used for indicating and selecting optional items on a screen, such as a menu. Communication button 111 is used for starting a communication. Clear button 112 is used for clearing and canceling a selected item. Off button 113 is used for stopping communication or turning main-power off. Functions described above are mainly for setting communication. Functions of these buttons are changed when cellular phone 1 is connected to other devices using a technology such as the Bluetooth technology. The functions of the buttons are also changed according to a state of a device connected to cellular phone 1. For example, when the main power of digital camera 15 is on and digital camera 15 is in a shooting mode, the buttons are set to be able to control digital camera 15 remotely. And when the main power of digital camera 15 is on and digital camera 15 is in a playback mode, the buttons are set to be able to transfer image data, stored in memory of digital camera 15, to image storing server 2. Even when the main power of digital camera 15 is off, the buttons can be set to be able to transfer image data, stored in memory of digital camera 15, to image storing server 2. When a device connected to cellular phone 1 is a digital camera, cellular phone 1 is automatically set into an image transfer mode in which image data, stored in memory of digital camera 15, can be transferred to image storing server 2.

Figure 18:
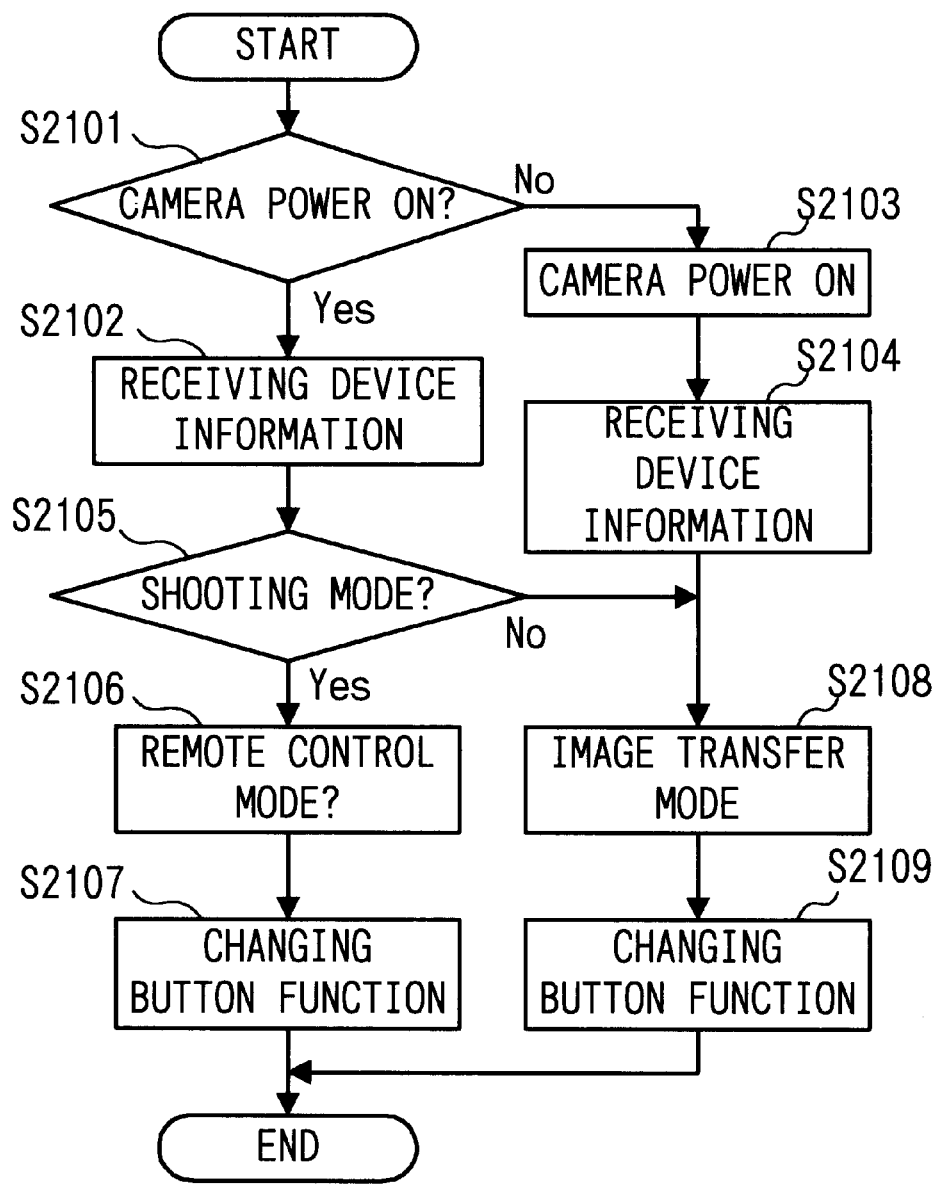
FIG. 18 is a flowchart showing a process that is performed in a CPU of a cellular phone when the cellular phone instructs a digital camera to be connected with the cellular phone.

The following explains control that is performed when cellular phone 1 is connected to digital camera 15. FIG. 18 is a flowchart showing a process that is performed in a CPU of a cellular phone 1 when the cellular phone 1 instructs a digital camera 15 to connect to the cellular phone 1. The process starts when connection between cellular phone 1 digital camera 15 is confirmed after connection button 105 is operated. In step S2101, it is determined whether the main power of digital camera 15 is on. If the main power of digital camera 15 is on, the process continues to step S2102. In step S2102, cellular phone 1 receives device information from digital camera 15. Cellular phone 15 can learn functions of digital camera 15 from the device information, and can set functions of the buttons. If the main power of digital camera 15 is not on, the process continues to step S2103. In step S2103, the main power of digital camera 15 is turned on. In step S2104, cellular phone 1 receives the device information from digital camera 15. In step S2105, it is determined whether the current mode set in digital camera 15 is the shooting mode. If the current mode is the shooting mode, the process continues to step S2106. In step S2106, digital camera 15 is set into a remote control mode. In step S2107, buttons of cellular phone 1 are set to be able to control digital camera 15 remotely, according to the device information. If the current mode is not the shooting mode or main power is not on, the process continues to step S2108. In step S2108, digital camera 15 is set into the image transfer mode in which image data stored in digital camera 15 is transferred to image storing server 2. In the image transfer mode, an instruction of printing transferred image data is executed as well as a transfer of image data. In step S2109, the function of the buttons is set to an image transfer function according to the device information.

Referring to FIG. 18, the functions changed in step S2107 and S2108 are specifically explained. Instep S2107, the function of the buttons has been set to the remote control function. In the remote control function mode, implementing button 106 serves as a shutter release button of digital camera 15. Up direction button 107 and down direction 108 are used for zooming up and down a photographic lens. In step S2109, the function of the buttons has been set to the image transfer function. In the image transfer mode, up direction button 107 and down direction button 108 are used for selecting specific image data among from a plurality of image data, and right direction button and left direction button are used for selecting a specific folder when a customer searches image data from a plurality of folders. Implementing button 106 is used for determining whether a customer transfers image data selected by up direction button 107 and down direction button 108. Digital camera 15 automatically transfers image data in itself to image storing server 2 through cellular phone 1 when the image data stored in the memory of digital camera 15 increases more than the predetermined number of prints. This feature allows a customer to avoid taking a long time to transmit image data. And the feature also allows a customer to avoid a difficulty in which he cannot search a desired print because he cannot remember the image of a long time ago.

Figure 19:
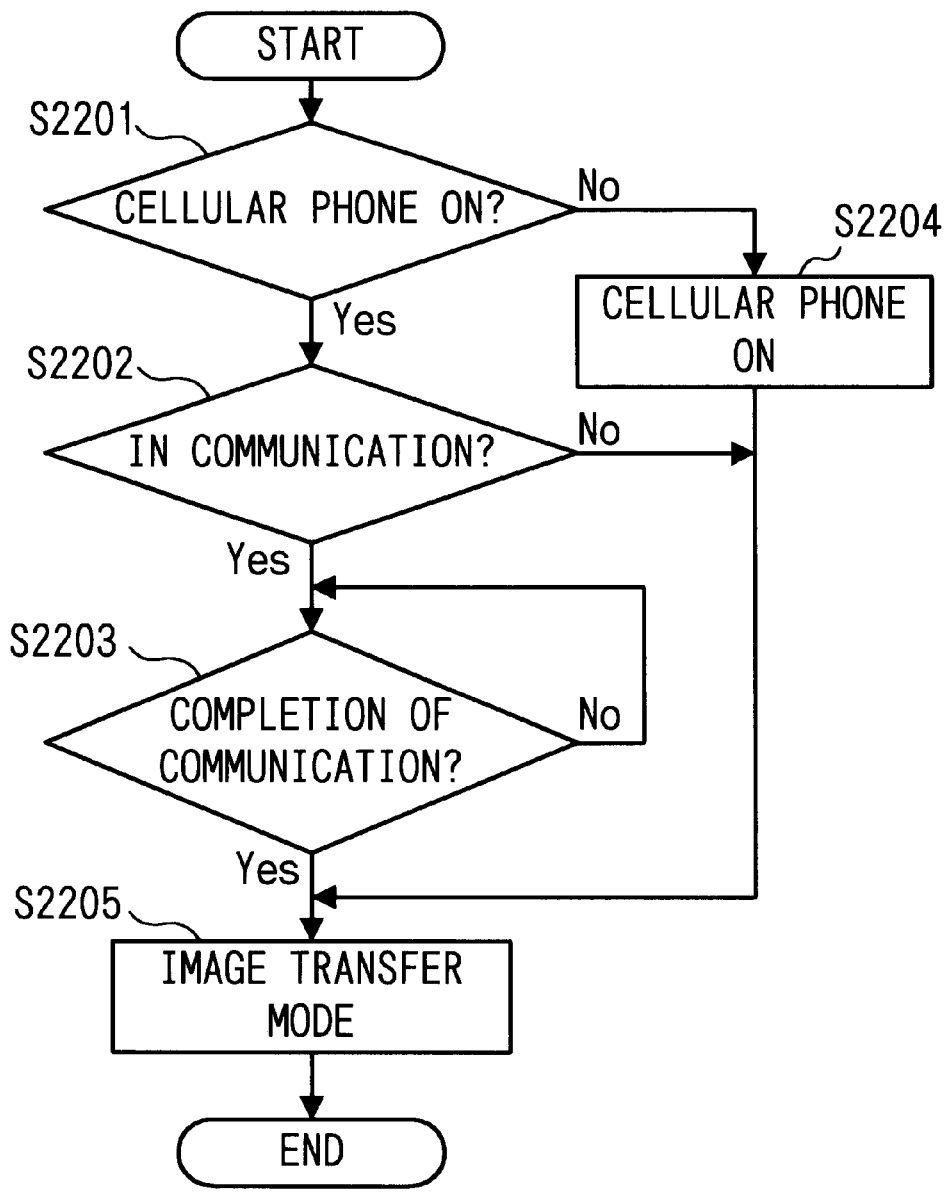
FIG. 19 is a flowchart showing a process that a digital camera transmits image data stored in the digital camera through a cellular phone.

The following explains an operation that digital camera 15 transmits image data to image storing server 2. FIG. 19 is a flowchart showing a process that a digital camera 15 transmits image data within the digital camera 15 through a cellular phone 1. The flow starts when image data stored in digital camera 15 increases more than the predetermined number of prints and digital camera 15 is automatically connected to cellular phone 1. Instep S2201, it is determined whether the main power of cellular phone 1 is on. If the main power of cellular phone 1 is on, the process continues to step S2202. In step S2202, it is determined whether cellular phone 1 is in communication. If cellular phone 1 is not in communication, the process continues to step S2205. If cellular phone 1 is in communication, the process continues to step S2203. In step S2203, it is determined whether communication with cellular phone 1 has been completed. If the communication has not been completed, the process repeats step S2203. If the communication has been completed, the process continues to step S2205. If the main power of cellular phone 1 is not on in step S2201, the process continues to step S2204. In step S2204, the main power of cellular phone 1 is turned on and the process continues to step S2205. In step S2205, a mode is changed to the image transfer mode, and after cellular phone 1 has been connected to image storing server 2, cellular phone 1 transfers image data to image storing server 2 and instruct image storing server 2 to print prints. Since digital camera 15 also has a connection button, operating this button allows digital camera 15 to connect to cellular phone 1 even though image data does not increase more than a predetermined number of prints. And, likewise, above flow can be started. The following explains the process that is operated in image storing server 2. By transferring image data and instructing to print in a short interval, as described above, it is possible to transfer image data without taking a long time, and to surely instruct image storing server 2 to print prints. However, such a manner of printing, packaging and delivering of prints in a short interval decreases efficiency and expenses more costs. To avoid this, image storing server 2 suspends execution of printing instructed by cellular phone 1 until image storing server 2 receives a new instruction of printing prints. Image storing server 2 does not only suspend the execution but also prompts a customer to transfer an instruction of printing to image storing server 2, when image storing server 2 is holding suspended image data.

Figure 20:
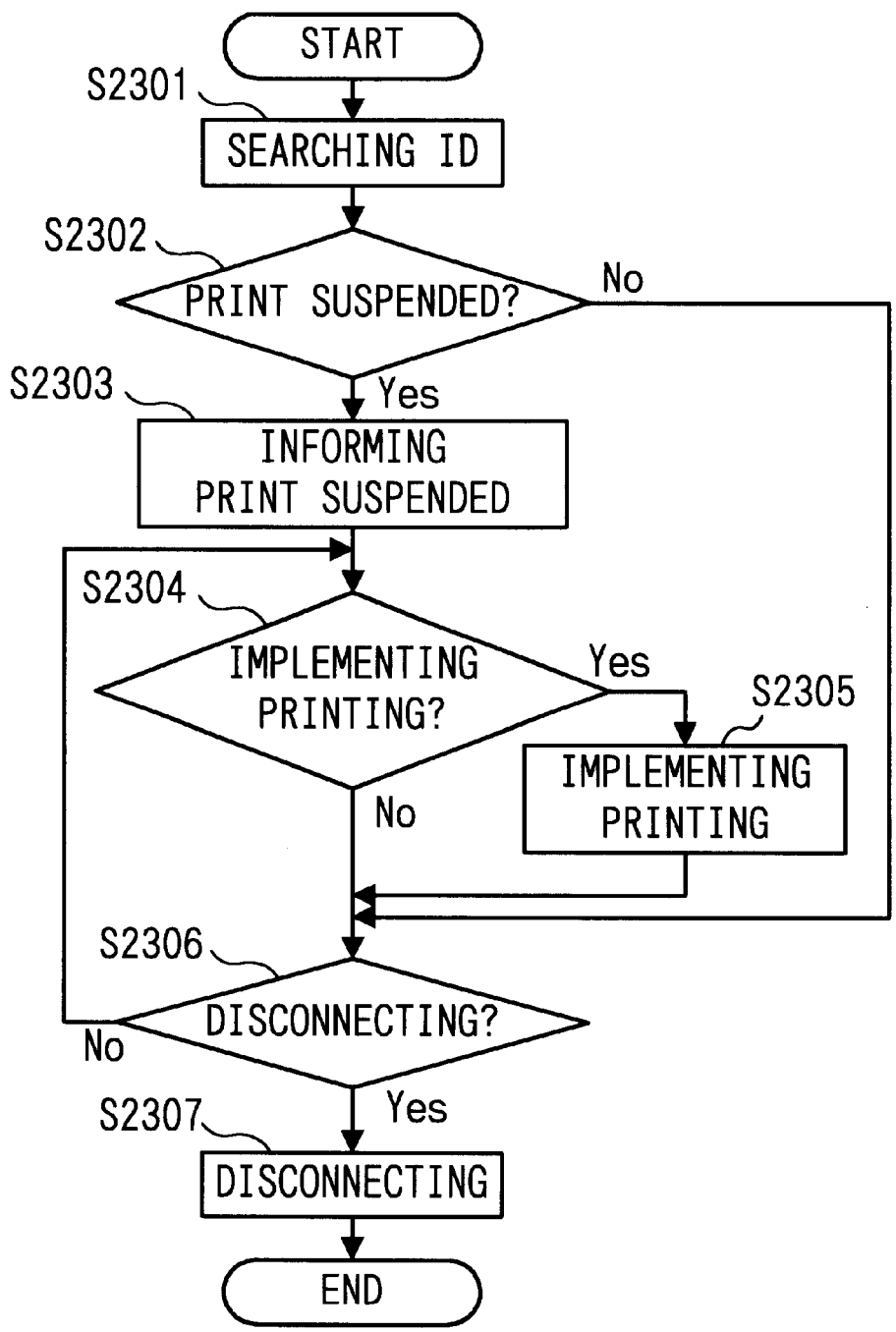
FIG. 20 is a flowchart showing a control process that is performed in a CPU of an image storing server.

FIG. 20 is a flowchart showing a control process that is performed in a CPU 203 of image storing server 2. The flow starts when image storing server 2 is connected to cellular phone 1. In step S2301, image storing server 2 searches ID data that has been transmitted from cellular phone 1. In step S2302, image storing server 2 determines whether suspended image data corresponding to the ID data exists. If the suspended image data corresponding to the ID data does not exist, the process continues to step S2306. If the suspended image data exists, the process continues to step S2303. In step S2303, image storing server 2 transfers a signal representing existence of suspended image data. In step S2304, it is determined whether image storing server 2 has received an instruction of printing. If image storing server 2 has received the instruction of printing, the process continues to step S2305. In step S2305, image storing server 2 instructs print server 3 to perform printing. If image storing server 2 has not received the instruction of printing, the process continues to step S2306. In step S2306, it is determined whether image storing server 2 has been disconnected from cellular phone 1. If image storing server 2 has not been disconnected from cellular phone 1, the process returns back to step S2304. If image storing server 2 has been disconnected from cellular phone 1, the process continues to step S2307, and the flow ends.

Figure 21:
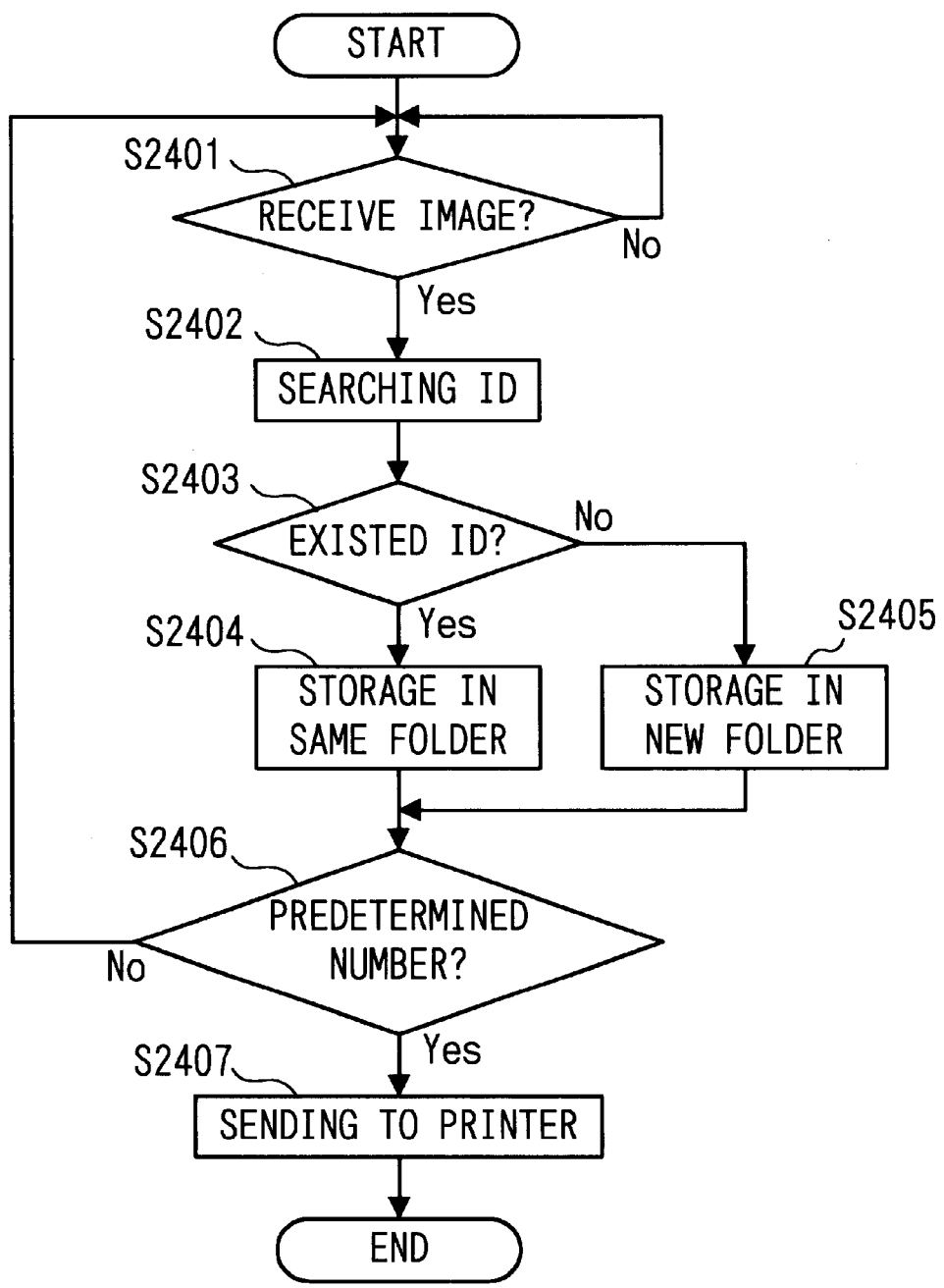
FIG. 21 is a flowchart showing a process that is controlled in a CPU of a print server when a signal received from an image storing server includes image data.

The following explains a process in which print server 3 instructs a printer to perform printing. Referring to FIG. 21, print server 3 automatically executes the process of printing when image data received from image storing server 2 has reached the predetermined number of prints. The predetermined number of prints must be the number that enables a company to generate a profit. In the process of printing shown in FIG. 22, the printing is implemented only when print server 3 receives an instruction of printing.

FIG. 21 is a flowchart showing a process that is performed in a CPU 303 of print server 3. This process is performed when print server 3 receives a signal having image data, from image storing server 2. In step S2401, it is determined whether print server 3 has received image data. If print server 3 has not received image data, the process repeats step S2401. If print server 3 has received image data, the process continues to step S2402. In step S2402, print server 3 searches ID data of image data that has been stored in print server 3. In step S2403, it is determined whether ID data of received image data matches one of the ID data stored in print server 3. If the ID data matches one of the ID data, process continues to step S2404. In step S2404, print server 3 stores the received ID into the same folder. If the ID data does not match one of the ID data stored in print server 3, the process continues step S2405. In step S2405, a new folder is created and the ID data is stored in this folder. In step S2406, it is determined whether image data has increased more than the predetermined number or image data includes an added instruction of printing. If image data has not increased more than the predetermined number or image data does not include an added instruction of printing, the process returns back to step S2401. If image data has increased more than the predetermined number or image data includes an added instruction of printing, the process continues to step S2407. In step S2407, the printer prints images of image data stored in the same folder, and the flow ends. In this case, printing of prints is not performed until the stored image data reaches the predetermined number of prints. However, even though image data does not reach the predetermined number of prints, it is also possible to implement the printing after the predetermined time has passed. This predetermined time is such time that the completion of printing is in time for a delivery truck start.

Figure 22:
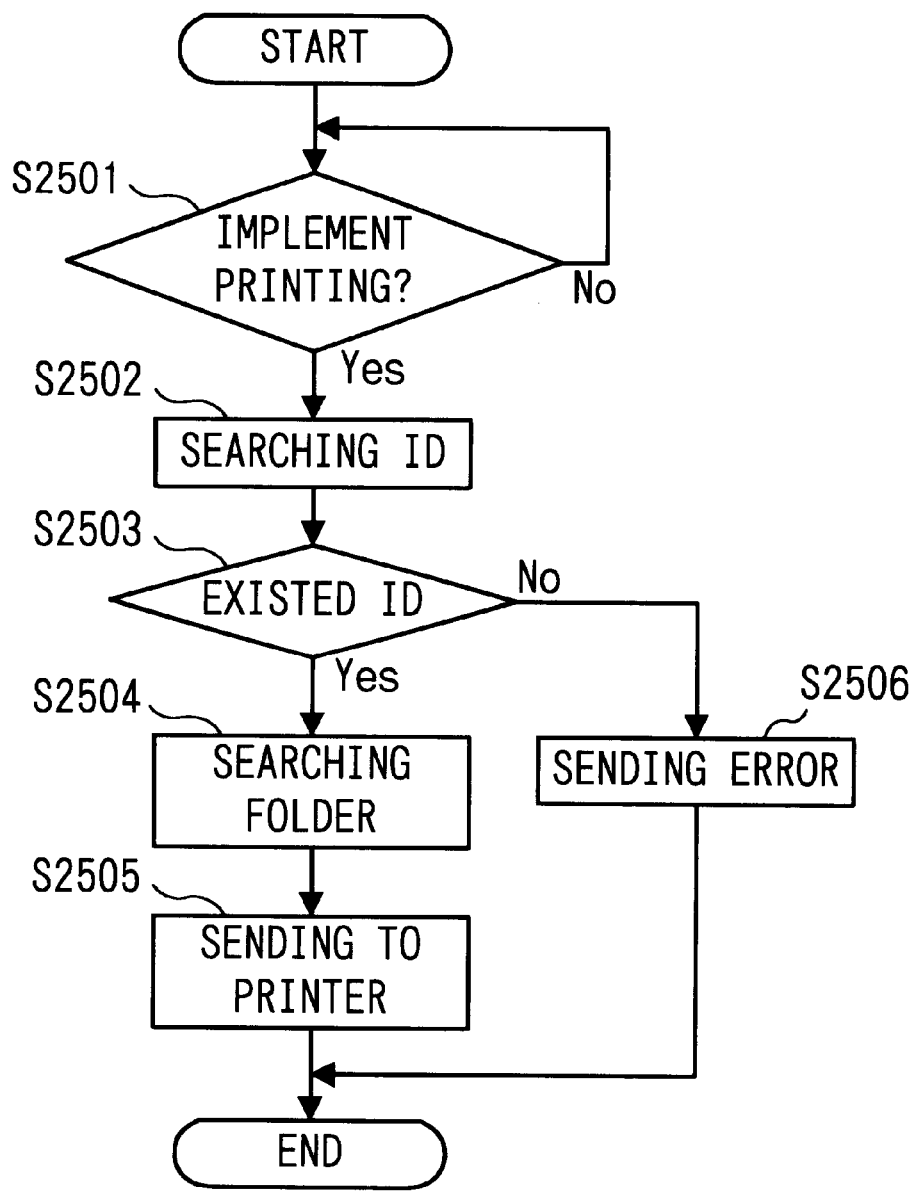
FIG. 22 is a flowchart showing a process that is controlled in a CPU of a print server when a signal received from an image storing server does not include image data.

FIG. 22 is a flowchart showing a process that is performed in a CPU 303 of print server 3. This process is performed when print server 3 receives a signal without image data, from image storing server 2. In step S2501, it is determined whether print server 3 has received an instruction of printing. If print server 3 has not received the instruction of printing, the process repeats step S2501. If print server 3 has received the instruction of printing, the process continues to step S2502. In step S2502, print server 3 searches ID data of stored image data. In step S2503, it is determined whether ID data of received image data matches one of the ID data of image data stored in print server 3. If the ID data of received image data matches one of the ID data, process continues to step S2504. In step S2504, print server 3 searches the image data of the ID data in a folder where the image data of the ID data is stored. If the ID data of received image data does not match one of the ID data, the process continues to step S2506. In step S2506, print server 3 transmits error data to image storing server 2. This error data means that image data to be printed does not exist in print server 3. In step S2505, prints of image data stored in the folder searched in step S2504 are printed, and the flow end. As described above, according to the second embodiment of the present invention, by transferring image data and instructing the server to process prints in a short interval, it is possible to transfer image data without a difficulty of taking long time, and to surely instruct the server to perform printing. And despite of treating a small quantity of prints, it is possible to print, package and deliver prints efficiently, and to decrease costs.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A print system comprising:
   a first receiver that receives an image file and a print order file from a customer, the image file having an image data area and an order data area;
   a first controller that copies information of the received print order file into the order data area of the received image file; and
   a printer that produces a print of the image data in the image file according to the information in the order data area of the image file.

2. The print system according to claim 1, further comprising a file format changer that changes the received image file into a new image file having an image data area and an order data area wherein the first controller copies information of the received print order file into the new image file and the printer produces a print of the image data in the new image file.

3. The print system according to claim 1, further comprising a second receiver that receives from the customer a request for information of status of the print system and a second controller that transmits the requested information to the customer.

4. The print system according to claim 1, wherein the printer is capable of further producing a print of a predetermined image data provided by a third party, and wherein the print system delivers to the customer the print ordered by the customer as well as the print of the predetermined image data.

5. The print system according to claim 1, further comprising a managing center and a laboratory having a printer, wherein the receiver is installed in the managing center and capable of receiving from the customer a first type of information including an image data and a print order data and a second type of information including an image data without an order of the print, and wherein the managing center further comprises a storage capable of storing a plurality of image data from both the types of information and a transmitter that automatically transmits the image data from the first type of information to the laboratory.

6. The print system according to claim 1, wherein the receiver receives a plurality of orders from customers to produce prints of image data, each order designating destination of delivery, and wherein the print system further comprises a second controller that selects a group of orders among all the orders in accordance with the destination of delivery for controlling the printer to give priority to the group of orders in producing the prints.

7. The print system according to claim 1, further comprising a managing center, a plurality of laboratories and a delivery system, wherein the first receiver is installed in the managing center, and wherein the managing center further comprises a selector that selects one of the plurality of laboratories in accordance with the schedule of the delivery system and the first controller that transmits the image data and the print order data to the selected laboratory, the printer being installed in the laboratory.

8. The print system according to claim 1, wherein the print order file includes an identification of the customer, and wherein the print system further comprises a second controller that forbids the printer to produce the prints until orders from the same customer becomes a predetermined number on the basis of the identification in the print order data.

9. The print system according to claim 1, wherein the print order file includes an identification of the customer, and wherein the print system further comprises a second controller that forbids the printer to produce the print of the image data of a predetermined customer until a predetermined time on the basis of the identification in the print order data.

10. The print system according to claim 1, wherein the print order file includes an identification of the customer, and wherein the print system further comprises:

a storage that stores the image data and the print order data;

a second receiver that receives a print execution data, the print execution data including an identification of a customer of the print order; and a second controller that forbids the printer to produce the prints until the second receiver receives the print execution data from the same customer as that of the print order data on the basis of the identification in the print order data and the print execution data.

11. The print system according to claim 1, further comprising a handy phone with a wireless system capable of communication with a digital camera, wherein the first receiver receives the image file and the print order file from the customer by way of the handy phone, the image file being originated by the digital camera.

12. The print system according to claim 11, wherein the digital camera is of a plurality of modes including a photography mode, and wherein the handy phone comprises a second receiver that receives information relating to the mode of the digital camera though the wireless system and a second controller that makes it possible for the handy phone to control the digital camera in taking a photograph through the wireless system if the second receiver receives information relating to the photography mode.

13. The print system according to claim 11, wherein the digital camera is of a plurality of modes including a playback mode, and wherein the handy phone comprises a second receiver that receives information relating to the mode of the digital camera though the wireless system and a third receiver that receives a digital image from the digital camera through the wireless system if the second receiver receives information relating to the playback mode, the digital image being received by the first receiver in the print system.

14. The print system according to claim 11, wherein the handy phone comprises a second receiver that receives a digital image from the digital camera through the wireless system and a second controller that forbids the second receiver to receive the digital image while the handy phone is busy.

15. The print system according to claim 11, wherein the digital camera is of a plurality of modes, and wherein the handy phone comprises a second receiver that receives information relating to the mode of the digital camera through the wireless system and a second controller that changes the mode of the handy phone in accordance with the information received from the digital camera through the wireless system.

16. A print system comprising:

a receiver that receives an image file and a print order file from a customer;

a file format changer that changes the received image file into a new image file having an image data area and an order data area;

a controller that copies information of the received print order file into the order data area of the new image file; and a printer that produces a print of the image data in the new image file according to the information in the order data area of the new image file.

17. The print system according to claim 16, wherein the file format changer changes the received image file into a new image file in compliance with DPOF (Digital Print Order Format).

18. The print system according to claim 16, further comprising a managing center and a laboratory, wherein the receiver is installed in the managing center and the printer is installed in the laboratory, the managing center and the laboratory being connected through a network.

19. The print system according to claim 16, wherein the receiver and the printer are located remote from each other and in communication through a network.

20. A print system capable of receiving an image data and a print order data from a customer and producing a print of the image data in accordance with the print order data, comprising:

a managing center and a plurality of laboratories remote from the managing center;

a receiver that receives from the customer a request for information of status of the print system; and a controller that transmits the requested information to the customer, wherein the receiver and the controller are installed in the managing center, the managing center and the laboratories being in communication through a network in preparing the information to be transmitted to the customer.

21. The print system according to claim 20, wherein the information includes an estimation of a time taken for the customer to receive the ordered print.

22. The print system according to claim 20, further comprising a managing center and a plurality of laboratories remote from the managing center, wherein the receiver and the controller are installed in the managing center, the information including an identification of a laboratory in agreement with a condition set by the customer in the request.

23. A print system comprising:

a receiver that receives an image data and a print order data from a customer;

a printer that produces a print of the image data in accordance with the order data, the printer being capable of further producing a print of a predetermined image data provided by a third party;

a controller that delivers to the customer the print ordered by the customer as well as the print of the predetermined image data.

24. The print system according to claim 23, wherein the predetermined image data includes an advertisement by the third party.

25. The print system according to claim 23, further comprising a printer monitor which monitors the status of the printer, wherein the printer determines whether or not to print the predetermined image data in response to the print monitor.

26. The print system according to claim 23, wherein the controller controls to avoid a duplicate delivery of print of the predetermined image data to the same customer.

27. The print system according to claim 23, further comprising a counter that counts a number of sheets of the print of the predetermined image data.

28. The print system according to claim 27, wherein the printer stops the print of the predetermined image data if the counter counts a predetermined number of sheets of the print of the predetermined image data.

29. The print system according to claim 23, further comprising a manager that bills the charge of the print of the predetermined image data.

30. The print system according to claim 23,
wherein the third party is a camera company and the predetermined image data is a photographic image taken by a digital camera produced by the camera company.

31. In a print system including a managing center and a laboratory having a printer, the managing center comprising:
a receiver capable of receiving from a customer a first type of information including an image data and a print order data and a second type of information including an image data without an order of the print;
a storage capable of storing a plurality of image data from both the types of information; and
a transmitter that automatically transmits the image data from the first type of information to the laboratory.

32. The print system according to claim 31,
further comprising a controller that adds a print request signal to the image data to be transmitted to the laboratory, the print request signal being from the print order data.

33. A print system comprising:
a receiver that receives a plurality of orders from customers to produce prints of image data, each order designating destination of delivery of the prints;
a printer that produces the prints; and
a controller that selects a group of orders among all the orders in accordance with the destination of delivery for controlling the printer to give priority to the group of orders in producing the prints.

34. The print system according to claim 33 further comprising a delivery system, wherein the controller selects orders with destinations covered by the most available schedule of the delivery system.

35. In a print system including a managing center, a plurality of laboratories and a delivery system, the managing center comprising:
a receiver that receives an image data and a print order data from a customer;
a selector that selects one of the plurality of laboratories in accordance with the schedule of the delivery system; and
a controller that transmits the image data and the print order data to the selected laboratory.

* * * * *